US012655252B2

(12) United States Patent
Altintas et al.

(10) Patent No.: US 12,655,252 B2
(45) Date of Patent: Jun. 16, 2026

(54) MIXED AROMATIC AMINE MONOMERS AND POLYMERS THEREOF

(71) Applicant: ExxonMobil Technology and Engineering Company, Annandale, NJ (US)

(72) Inventors: Ozcan Altintas, Franklin Park, NJ (US); Justin P. Romaire, Brick, NJ (US); Abhimanyu O. Patil, Annandale, NJ (US); August W. Bosse, Pennington, NJ (US)

(73) Assignee: Exxon Mobil Technology and Engineering Company, Spring, TX (US)

( * ) Notice: Subject to any disclaimer, the term of this patent is extended or adjusted under 35 U.S.C. 154(b) by 560 days.

(21) Appl. No.: 18/030,030

(22) PCT Filed: Oct. 7, 2021

(86) PCT No.: PCT/US2021/071757
§ 371 (c)(1),
(2) Date: Apr. 3, 2023

(87) PCT Pub. No.: WO2022/082148
PCT Pub. Date: Apr. 21, 2022

(65) Prior Publication Data

US 2023/0374214 A1 Nov. 23, 2023

Related U.S. Application Data

(60) Provisional application No. 63/090,296, filed on Oct. 12, 2020.

(51) Int. Cl.
*C08G 69/00* (2006.01)
*C08G 69/26* (2006.01)

(52) U.S. Cl.
CPC ............. *C08G 69/00* (2013.01); *C08G 69/26* (2013.01); *C08G 69/265* (2013.01); *C08J 2377/06* (2013.01)

(58) Field of Classification Search
CPC ..... C08J 2377/06; C08G 69/26; C08G 69/265
See application file for complete search history.

(56) References Cited

U.S. PATENT DOCUMENTS

| | | | | |
|---|---|---|---|---|
| 3,597,391 | A * | 8/1971 | Hara et al. | C08G 73/18 528/229 |
| 3,981,933 | A | 9/1976 | Cook et al. | |
| 7,745,544 | B2 | 6/2010 | Patil | |
| 8,344,070 | B2 | 1/2013 | Squire et al. | |
| 8,519,057 | B2 | 8/2013 | Patil et al. | |
| 9,771,466 | B2 | 9/2017 | Patil et al. | |
| 10,077,409 | B2 | 9/2018 | Ng et al. | |
| 10,233,403 | B2 | 3/2019 | Patil et al. | |
| 2004/0073066 | A1* | 4/2004 | Zehner | C07B 43/04 564/416 |
| 2004/0230027 | A1* | 11/2004 | Etchells, III | C08G 69/04 528/335 |
| 2004/0249213 | A1* | 12/2004 | Keggenhoff | C07C 201/08 564/419 |
| 2005/0197518 | A1 | 9/2005 | Miller et al. | |
| 2012/0160363 | A1 | 6/2012 | Jin et al. | |
| 2017/0144963 | A1 | 5/2017 | Pennemann et al. | |
| 2018/0237379 | A1 | 8/2018 | Shiau et al. | |

FOREIGN PATENT DOCUMENTS

| | | |
|---|---|---|
| EP | 2644637 | 10/2013 |
| EP | 2441801 | 3/2018 |
| WO | 2019113204 A1 | 6/2019 |

OTHER PUBLICATIONS

Carothers, W. H. (1931). Polymerization. Chemical Reviews, 8(3), 353-426.
Deshmukh, Y. S., Wilsens, C. H., Verhoef, R., Hansen, M. R., Dudenko, D., Graf, R., . . . & Rastogi, S. (2016). Conformational and structural changes with increasing methylene segment length in aromatic-aliphatic polyamides. Macromolecules, 49(3), 950-962.
De Ruijter, C., Jager, W. F., Groenewold, J., & Picken, S. J. (2006). Synthesis and characterization of rod-coil poly (amide-block-aramid) alternating block copolymers. Macromolecules, 39(11), 3824-3829.
Li, M., Bijleveld, J., & Dingemans, T. J. (2018). Synthesis and properties of semi-crystalline poly (decamethylene terephthalamide) thermosets from reactive side-group copolyamides. European Polymer Journal, 98, 273-284.
Yamamoto, H., Tashiro, K., Ishino, K., Takahashi, M., Endo, R., Asada, M., . . . & Ishii, T. (2017). Crystal structures and phase transition behavior of Poly (nonamethylene terephthalamide) and its model compounds. Polymer, 116, 378-394.
Zhou, S., Wang, X., Zhang, W., Zhang, M., Zhang, X., Zhao, N., . . . & Fan, X. (2018). Facile preparation and characterization of soluble aramid. Journal of Applied Polymer Science, 135(23), 4634159.

(Continued)

*Primary Examiner* — Gregory Listvoyb
(74) *Attorney, Agent, or Firm* — C. Tumey Law Group PLLC

(57) ABSTRACT

Processes and systems for producing isomeric mixtures of aromatic amine monomers from aromatic feeds. An example process for producing isomeric mixtures of aromatic amine monomers from aromatic feeds may include nitrating at least a portion of an aromatic feed to produce a mixture of nitrated aromatic compounds. The example process may further include hydrogenating at least a portion of the nitrated aromatic compounds to produce an isomeric mixture of aromatic amine monomers. The example process may further include processing the isomeric mixture of aromatic amine monomers to form a product selected from an aromatic compound with a different functional group than the aromatic amine monomers, a polymerized product, or a reaction product of the aromatic amine monomers and H2S.

21 Claims, 11 Drawing Sheets

(56) References Cited

OTHER PUBLICATIONS

Liang, Q., Liu, P., Liu, C., Jian, X., Hong, D., & Li, Y. (2005). Synthesis and properties of lyotropic liquid crystalline copolyamides containing phthalazinone moiety and ether linkages. Polymer, 46(16), 6258-6265.
Hsiao, S. H., Chen, C. W., & Liou, G. S. (2004). Novel aromatic polyamides bearing pendent diphenylamino or carbazolyl groups. Journal of Polymer Science Part A: Polymer Chemistry, 42(13), 3302-3313.
Cretenoud, J., Galland, S., Plummer, C. J., Michaud, V., Bayer, A., Lamberts, N., . . . & Frauenrath, H. (2017). High-temperature copolyamides obtained by the efficient transamidation of crystalline-crystalline polyamide blends. Journal of Applied Polymer Science, 134(4), 44349 .
Sun, X., Mai, K., Zhang, C., Cao, M., Zhang, Y., & Zhang, X. (2017). Nonisothermal crystallization kinetics of bio-based semi-aromatic polyamides. Journal of Thermal Analysis and Calorimetry, 130(2), 1021-1030.
Li, M. (2019). Study on melting and polymorphic behavior of poly (decamethylene terephthalamide). Journal of Polymer Science Part B: Polymer Physics, 57(8), 465-472.
Yu, G., Li, B., Liu, J., Wu, S., Tan, H., Pan, C., & Jian, X. (2012). Novel thermally stable and organosoluble aromatic polyamides with main chain phenyl-1, 3, 5-triazine moieties. Polymer degradation and stability, 97(9), 1807-1814.
Patil, P. S., Pal, R. R., Salunkhe, M. M., Maldar, N. N., & Wadgaonkar, P. P. (2007). Synthesis of aromatic poly (amide-imide) s from novel diimide-diacid (DIDA) containing sulphone and bulky pendant groups by direct polycondensation with various diamines. European Polymer Journal, 43(12), 5047-5054.
Zhou, S., Zhang, M., Wang, R., Ping, J., Zhang, X., Zhao, N.,& Fan, X. (2017). Synthesis and characterization of new aramids based on o-(m-triphenyl)-terephthaloyl chloride and m-(m-triphenyl)-isophthaloyl chloride. Polymer, 109, 49-57.
Pal, R. R., Patil, P. S., Salunkhe, M. M., Maldar, N. N., & Wadgaonkar, P. P. (2009). Synthesis, characterization and constitutional isomerism study of new aromatic polyamides containing pendant groups based on asymmetrically substituted meta-phenylene diamines. European Polymer Journal, 45(3), 953-959.
Yoshimitsu, Y., Sugiyama, K., Shiraishi, S., Oda, T., & Ohashi, T. (1994). Synthesis and Properties of Aromatic Polyamides and Polyamide-Smectic Oligomer Graft Copolymer. Polymer journal, 26(5), 551.
Korean Office Action for KR Patent Application No. 2023-7011174 dated May 20, 2025. English Translation with Original Untranslated Version, PDF file. 17 pages.
Canadian Office Action for CA Patent Application No. 3,194,575 dated Jun. 11, 2025. PDF file. 5 pages.
Coombes et al., Electrophilic Aromatic Substitution. Part VIII. Isomer Ratios and Assignment of Mechanism in Aromatic Nitration. o-xylene and biphenyl, Journal of the Chemical Society B: Physical Organic, 1971, 2443-2447.
Fischer et al., Formation of Adducts in the Nitration of p-Xylene. Exchange and Rearomatization Reactions of p-Kylene Adducts, Canadian Journal of Chemistry, 1974, 3960-3970.
Dewar et al., Electrophilic Substitution. Part II. The nitration of napthalene and perylene., Journal of the Chemical Society (Resumed), 1956, 1441-1443.
Olah et al., Nitration of naphthalene and remarks on the mechanism of electrophilic aromatic nitration, Proceedings of the National Academy of Sciences 78.6 (1981): 3298-3300.
Simamura, O., & Mizuno, Y. (1957). The Competitive Nitration of Biphenyl and Benzene by Nitric Acid in Acetide Anhydride. Bulletin of the Chemical Society of Japan, 30(2), 196-197.
Billing, C. J., & Norman, R. O. C. (1961). 758. The ortho: para-ratio in aromatic substitution. Part IV. The nitration of biphenyl. Journal of the Chemical Society (Resumed), 3885-3888.
Taylor, R. (1966). The ortho: para ratio in the nitration of biphenyl. Journal of the Chemical Society B: Physical Organic, 727-733.
Brink, J. A., & Shreve, R. N. (1954). Nitration of 2-Methylnaphthalene. Industrial & Engineering Chemistry, 46(4), 694-702.
Patil, P. T., Malshe, K. M., Dagade, S. P., & Dongare, M. K. (2003). Regioselective nitration of o-xylene to 4-nitro-o-xylene using nitric acid over solid acid catalysts. Catalysis Communications, 4(8), 429-434.
Ju, K. S., & Parales, R. E. (2010). Nitroaromatic compounds, from synthesis to biodegradation. Microbiol. Mol. Biol. Rev., 74(2), 250-272.
Reglero, J. R., Trigo-López, M., García, F. C., & García, J. M. (2017). Functional Aromatic Polyamides. Polymers, 9(9), 414.
García, J. M., García, F. C., Serna, F., & José, L. D. L. P. (2010). High-performance aromatic polyamides. Progress in Polymer Science, 35(5), 623-686.
Marchildon, K. (2011). Polyamides-still strong after seventy years. Macromolecular Reaction Engineering, 5(1), 22-54.
Rozenberg, B. A. (1986). Kinetics, thermodynamics and mechanism of reactions of epoxy oligomers with amines. In Epoxy resins and composites II (pp. 113-165). Springer, Berlin, Heidelberg.
Prime, R. B. (1973). Differential scanning calorimetry of the epoxy cure reaction. Polymer Engineering & Science, 13 (5), 365-371.
Vidil, T., Tournilhac, F., Musso, S., Robisson, A., & Leibler, L. (2016). Control of reactions and network structures of epoxy thermosets. Progress in Polymer Science, 62, 126-179.
Mezzenga, R., Boogh, L., Månson, J. A. E., & Pettersson, B. (2000). Effects of the branching architecture on the reactivity of epoxy-amine groups. Macromolecules, 33(12), 4373-4379.
Jin, F. L., Li, X., & Park, S. J. (2015). Synthesis and application of epoxy resins: A review. Journal of Industrial and Engineering Chemistry, 29, 1-11.
Hodgkin, J. H., Simon, G. P., & Varley, R. J. (1998). Thermoplastic toughening of epoxy resins: a critical review. Polymers for advanced technologies, 9(1), 3-10.
International Search Report and Written Opinion for PCT/US2021/071757 dated Jan. 28, 2022.
Morgan, P. W.; Kwolek, S. L. (1975). Polymides from Phenylenediamines and Aliphatic Diacids. Macromolecules, 8(2), 104-111.

* cited by examiner

MIXED AROMATIC AMINE MONOMERS AND POLYMERS THEREOF

FIELD OF THE INVENTION

This application relates to processes and systems for producing isomeric mixtures of aromatic amine monomers from aromatic feeds. The aromatic amine monomers may be polymerized to produce polymers with tunable physical properties, may be functionalized to aromatic amine monomers to a different functional group, or may be utilized to capture $H_2S$.

BACKGROUND OF THE INVENTION

Nitroaromatic compounds are used extensively as feedstock materials in the chemical and petrochemical industry for the manufacture of consumer products. The nitroaromatic compounds are often catalytically reduced to produce aromatic amine intermediates which are then utilized to produce a variety of dyes, explosives, pharmaceuticals, drugs, perfumes, pesticides, agrochemicals, detergents, lubricants, food-additives, and polymers, for example. One application of aromatic amine intermediates may be in the synthesis of polyamides for advanced polymeric materials which may have applications in aerospace, construction, and health industries.

SUMMARY OF THE INVENTION

Disclosed herein is an example processes for producing isomeric mixtures of aromatic amine monomers from aromatic feeds. The example process may include nitrating at least a portion of an aromatic feed to produce a mixture of nitrated aromatic compounds; hydrogenating at least a portion of the nitrated aromatic compounds to produce an isomeric mixture of aromatic amine monomers; and processing the isomeric mixture of aromatic amine monomers to form a product selected from an aromatic compound with a different functional group than the aromatic amine monomers, a polymerized product, or a reaction product of the aromatic amine monomers and H2S.

Further disclosed herein is another process for producing a polymerized product from isomeric mixtures of aromatic amine monomers. The example process may include reacting a mixture of aromatic diamine monomers comprising at least two aromatic diamine monomers with a polymerizing agent to produce a polymerized product, wherein the mixture of aromatic diamine monomers are produced by a process comprising nitrating at least a portion of an aromatic feed to produce a mixture of nitrated aromatic compounds and hydrogenating at least a portion of the nitrated aromatic compounds to produce an isomeric mixture of aromatic amine monomers.

Further disclosed herein is another process for producing a polymerized product from isomeric mixtures of aromatic amine monomers. The example process may include selecting at least a first aromatic diamine monomer and a second aromatic diamine monomer such that a polymerized product comprising the first aromatic diamine monomer and the aromatic diamine monomer has a glass transition temperature below a glass transition temperature requirement; and polymerizing the first aromatic diamine monomer, the second aromatic diamine monomer, and an alkyl diacyl halide to produce the polymerized product with the glass transition temperature below the glass transition temperature requirement.

BRIEF DESCRIPTION OF THE DRAWINGS

These drawings illustrate certain aspects of the present disclosure and should not be used to limit or define the disclosure.

DETAILED DESCRIPTION OF THE INVENTION

Figure 1:
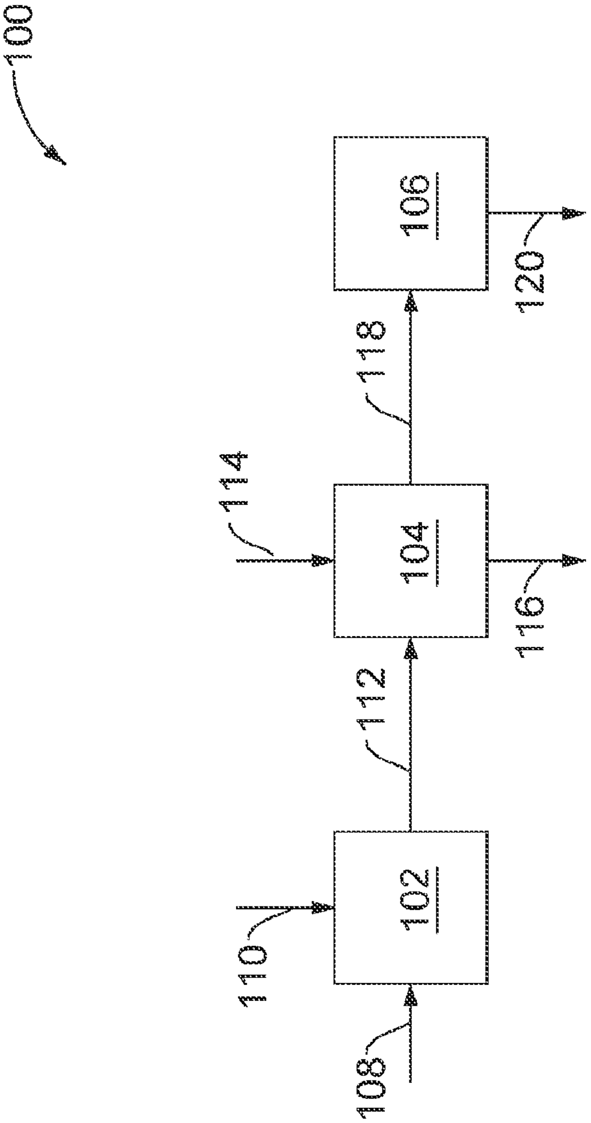
FIG. 1 is a schematic diagram of a process for production of aromatic amine monomers from an aromatic feed in accordance with embodiments of the present disclosure.

This application relates to processes and systems for producing isomeric mixtures of aromatic amine monomers from aromatic feeds and production of polyamides from the aromatic amine monomers. This application further relates to functionalizing aromatic amine monomers to other functional groups as well as applications to using the aromatic amine monomers in hydrogen sulfide capture.

There may be several potential advantages to the methods and systems disclosed herein, only some of which may be alluded to in the present disclosure. As discussed above, aromatic amine intermediates are important in the production of many useful products. Advantageously, the embodiments disclosed herein provide processes and systems that functionalize components of an aromatic feed to provide isomeric mixtures of aromatic amine monomers which when utilized to produce said products yield products with improved physical properties. For example, the aromatic amine monomers may be used to produce thermoplastics with improved and/or tunable mechanical properties. The aromatic amine monomers may be further functionalized to yield different functional groups.

Embodiments may include an integrated process for the production of an isomeric mixture of aromatic amine monomers from an aromatic feed and processing the isomeric mixture of aromatic amine monomers to form a product stream. The process may include the following steps: (1) nitration of at least a portion of an aromatic feed to produce a mixture of nitrated aromatic compounds; (2) catalytic hydrogenation of the mixture of nitrated aromatic compounds to produce the isomeric mixture of aromatic amine monomers corresponding to the mixture of nitrated aromatic compounds; and (3) processing the isomeric mixture of aromatic amine monomers to form a product. The aromatic feed may be from any source which contains aromatic compounds which may include a standalone source or a process stream from a unit within a refinery or chemical plant, for example. By way of example, Step (3) may include polymerizing at least a portion of the isomeric mixture of aromatic amine monomers to produce a thermoplastic polymer.

In Step (1), any suitable technique for nitration of aromatic compounds to nitrated aromatic compounds may be used. For example, the nitration method may be a heterolytic or radical nitration method which may be non-catalyzed proceeding by reaction of the nitrating compound with the aromatic compounds or may be catalyzed by any suitable nitration catalyst. The nitration reaction may proceed in a gas or liquid phase and may be carried out in any suitable reactor. An exemplary nitration method is the mixed acid approach whereby the nitrating compound comprises a mixture of sulfuric acid and nitric acid. Another nitration method may include utilizing nitrogen dioxide and a catalyst such as Ni(CH3COO)2×4H2O. Reaction 1, corresponding to Step (1), is a generalized nitration reaction whereby an aromatic compound (R) is reacted with a nitrating compound (NO2) to produce a nitrated aromatic compound (R—NO2).

Reaction 1

$$R + NO_2 \xrightarrow{\text{yields}} R—NO_2$$

Any of a variety of aromatic compounds, corresponding to (R) in Reaction 1, may be used in the nitration of Step (1). Suitable aromatic compounds may have at least 5 carbons, such as 1,3-cyclopentadiene, up to steam cracker tar which may have 17 or more carbons. Alternatively, suitable aromatic compounds may have boiling points in the range of about 40° C. to about 300° C. at atmospheric pressure. Some specific examples of aromatic compounds may include, but are not limited to, single ring aromatics such as 1,3-cyclopentadiene, benzene, xylenes (o-xylene, m-xylene, p-xylene), mesitylene, ethylbenzene, cumene, 1, 2, 4, 5— tetramethyl benzene, C1-C12 alkyl substituted benzene, biphenyl, C1-C12 alkyl substituted biphenyl, tetrahydronaphthalene, C1-C2 alkyl substituted tetrahydronaphthalene, and polyaromatic hydrocarbons such as naphthalene, acenaphthylene, biphenylene, fluorene, phenanthrene, anthracene, fluoranthene, pyrene, benzanthracene, chrysene, benzo[a] pyrene, and C1-C12 alkyl substituted compounds thereof. Although only some single ring aromatics and polyaromatics are specified herein, single ring aromatics and/or polyaromatic compounds may be used without deviating from the present disclosure.

The nitration of Step (1) may be carried out at any suitable nitration conditions, including temperature, pressure, and residence time. For example, the nitration of Step (1) may be carried out at any temperature of about −50° C. or greater. In some embodiments, the temperature of the nitration step may be selected to be in a range of from about −50° C. to about 100° C. or, from about −50° C. to about 0° C., from about 0° C. to about 50° C., or from about 50° C. to about 100° C. In some embodiments, the nitration may be carried out at a pressure of about 0.5 bar to about 10 bar or, alternatively, about 0.5 bar to about 1 bar, or about 1 bar to about 10 bar. In some embodiments, the residence time in the nitration reactor (e.g., nitration reactor 102 on FIG. 1) may be about 2 hours to about 48 hours or greater, depending on the desired amount of nitration, for example. Alternatively, the residence time may be selected to be about 2 hours to about 4 hours, about 4 hours to about 10 hours, about 6 hours to about 8 hours, or about 10 hours to about 48 hours. The residence time may be selected to give any desired conversion of the aromatic compounds to nitrated aromatic compound such as from about 1 mol % conversion to about 100 mol. % conversion, or about 15% to about 70% conversion, or about 20% to about 60% conversion, or about 30% to about 50% conversion. In embodiments where the nitrated aromatic compounds contain more than one nitro group, selectivity to single, double, triple, or any other number of nitro groups may be controlled, for example, by selecting reaction conditions that promote the desired amount of nitro groups in the nitrated aromatic compound.

In Step (2), any suitable technique for hydrogenation of the nitrated aromatic compounds may be used. Some suitable hydrogenation techniques may include, but are not limited to, hydrogenation using H2 with palladium on carbon (Pd/C) catalyst, H2 and Raney nickel catalyst, iron (Fe) under acidic conditions such as in the presence of acetic acid, zinc (Zn) under acidic conditions such as in the presence of acetic acid, tin(II) chloride (SnCl2) with alcohol reflux, sodium sulfide (Na2S) with alcohol reflux, lithium aluminum hydride (LiAlH4) in THF, or any other suitable hydrogenation technique. The hydrogenation reaction may proceed in a gas or liquid phase and may be carried out in any suitable reactor. Reaction 2, corresponding to Step (2), is a generalized hydration reaction whereby the nitrated aromatic compound (R—NO2) produced in Step (1) is hydrogenated with hydrogen (H2) to form the aromatic amine monomer (R—NH2) corresponding to the nitrated aromatic compound.

Reaction 2

$$R—NO_2 + H_2 \xrightarrow{\text{yields}} R—NH_2$$

The hydrogenation of Step (2) may be carried out at any suitable hydrogenation conditions, including temperature, pressure, and residence time. For example, the hydrogenation of Step (2) may be carried out at any temperature of about −50° C. or greater. In some embodiments, the temperature of the hydrogenation step may be selected to be in a range of from about −50° C. to about 100° C. Alternatively the temperature of the hydrogenation step may be selected to be in a range of from about from about from about −50° C. to about 0° C., from about 0° C. to about 50°, or about 50°

C. to about 100° C. In some embodiments, the hydrogenation may be carried out at a pressure of about 0.5 bar to about 40 bar or, alternatively, about 0.5 bar to about 1 bar, about 1 bar to about 10 bar, or about 10 bar to about 40 bar. In some embodiments, the residence time in the hydrogenation reactor (e.g., hydrogenation reactor 104 on FIG. 1) may be about 2 hours to about 48 hours or greater, depending on the desired amount of hydrogenation, for example. Alternatively, the residence time may be selected to be about 2 hours to about 4 hours, about 4 hours to about 10 hours, about 6 hours to about 8 hours, or about 10 hours to about 48 hours. The residence time may be selected to give any desired conversion of the nitrated aromatic compounds to the corresponding aromatic amine monomer such as from about 1 mol. % conversion to about 100 mol. % conversion, or about 15% to about 70% conversion, or about 20% to about 60% conversion, or about 30% to about 50% conversion. In some embodiments, the aromatic amine monomer produced from step (2) may be desired to be stored for a period of time. Aromatic amine monomers may be preserved by treatment with concentrated HCl such that the aromatic amine monomers form the corresponding ammonium salts which may be more stable than the aromatic amine monomer.

FIG. 1 is a schematic diagram of an embodiment of an integrated process 100 for producing aromatic amine monomers and subsequent polymerization thereof to produce polyamides. As illustrated, integrated process 100 may include nitration reactor 102, hydrogenation reactor 104, and production unit 106. Integrated process 100 may begin with feeding an aromatic feed 108 containing an aromatic compound and a nitrating agent feed 110 containing a nitrating agent to nitration reactor 102. The nitration reactor 102 may contain reaction conditions such that at least a portion of the aromatic compound from aromatic feed 108 may be reacted with at least a portion of the nitrating agent from nitrating agent feed 110 to produce a mixture of nitrated aromatic compounds in accordance with Step (1) above. The nitrated aromatic compounds produced in nitration reactor 102 may be fed to hydrogenation reactor 104 as nitrated aromatic stream 112.

Aromatic feed 108 may be from any source any source which contains aromatic compounds which may include a standalone source or a process stream from a unit within a refinery or chemical plant, for example. In embodiments, aromatic feed 108 may include one or more process streams such as reformate from a catalytic reformer, a BTX (benzene, toluene, xylene) steam a transalkylation unit, a bottoms stream from an atmospheric distillation column, a bottoms stream from an FCC (fluidized catalytic cracker) stream, or a SATC stream from a SATC unit, for example. In embodiments, aromatic feed 108 may include any of the aromatic compounds disclosed herein. While aromatic feed 108 and nitrating agent feed 110 are shown being fed separately into nitration reactor 102, it should be understood that these streams may be combined and co-fed into nitration reactor 102, as desired for a particular application.

In hydrogenation reactor 104, at least a portion of the nitrated aromatic compounds in nitrated aromatic stream 112 may be hydrogenated to form the corresponding aromatic amine monomers in accordance with Step (2) above. Hydrogen stream 114 comprising hydrogen gas may be introduced to hydrogenation reactor 104 as a hydrogen source in the hydrogenation reaction. Excess hydrogen may exit hydrogenation reactor 104 as recycle stream 116, for example. An aromatic amine monomer steam 118 comprising the aromatic amine monomers produced in Hydration reactor 104 may be fed to production unit 106.

From hydrogenation reactor 104, at least a portion of the aromatic amine monomer stream 118 may be introduced into production unit 106. In production unit 106, any of the previously discussed applications of the aromatic amine monomers may be performed to produce a desired product corresponding to Step (3) above. Product steam 120 may exit production unit 106. Some exemplary production units may include polymerization units capable of polymerizing the aromatic amine monomers to polyamides including those of Reactions 14-25 (see below), functionalization units which functionalize the aromatic amine monomers to other functional groups, and an H2S capture unit which uses the aromatic amine monomers to remove hydrogen sulfide from a process steam, for example.

Reaction 3 shows the nitration of o-xylene, corresponding to Step (1) above, to a mixture of nitrated o-xylene compounds and the subsequent hydrogenation, corresponding to Step (2) above, of the nitrated o-xylene compounds to an isomeric mixture of aromatic diamine monomers. The molar fraction of each isomer is generally related to reaction kinetics and reaction conditions and may vary depending of the particular reaction conditions selected.

Reaction 3

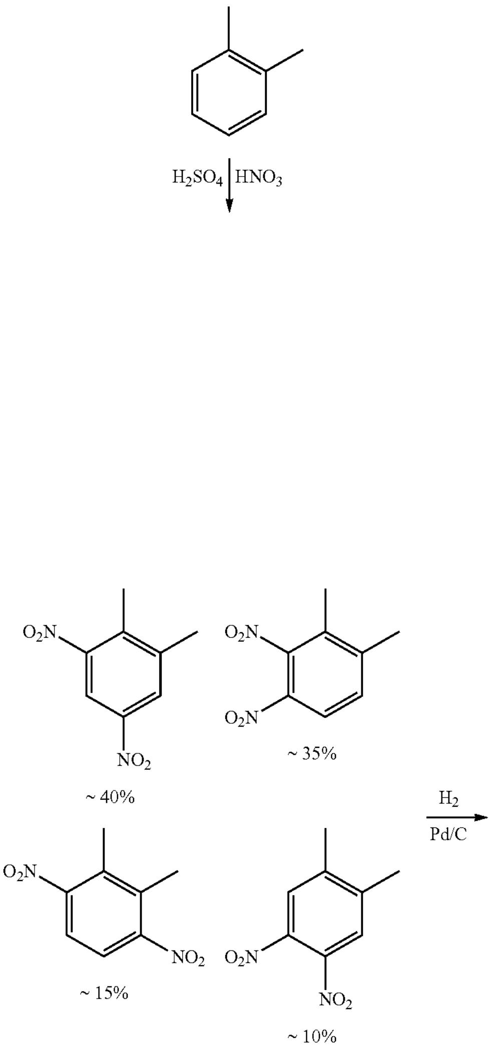

-continued

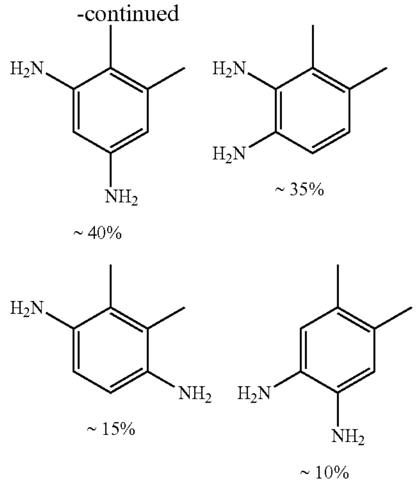

Reaction 4 shows the nitration of m-xylene, corresponding to Step (1) above, to a mixture of nitrated m-xylene compounds and the subsequent hydrogenation, corresponding to Step (2) above, of the nitrated m-xylene compounds to an isomeric mixture of aromatic diamine monomers. The molar fraction of each isomer is generally related to reaction kinetics and reaction conditions and may vary depending of the particular reaction conditions selected.

Reaction 4

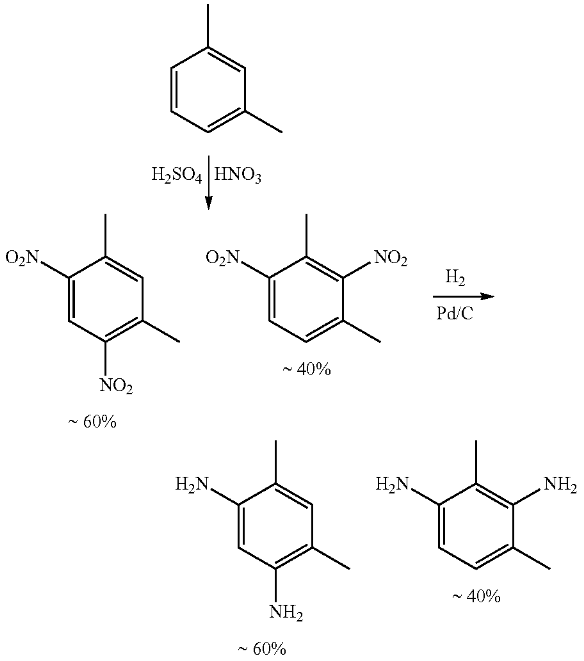

Reaction 5 shows the nitration of p-xylene, corresponding to Step (1) above, to a mixture of nitrated p-xylene compounds and the subsequent hydrogenation, corresponding to Step (2) above, of the nitrated p-xylene compounds to an isomeric mixture of aromatic diamine monomers. The molar fraction of each isomer is generally related to reaction kinetics and reaction conditions and may vary depending of the particular reaction conditions selected.

Reaction 5

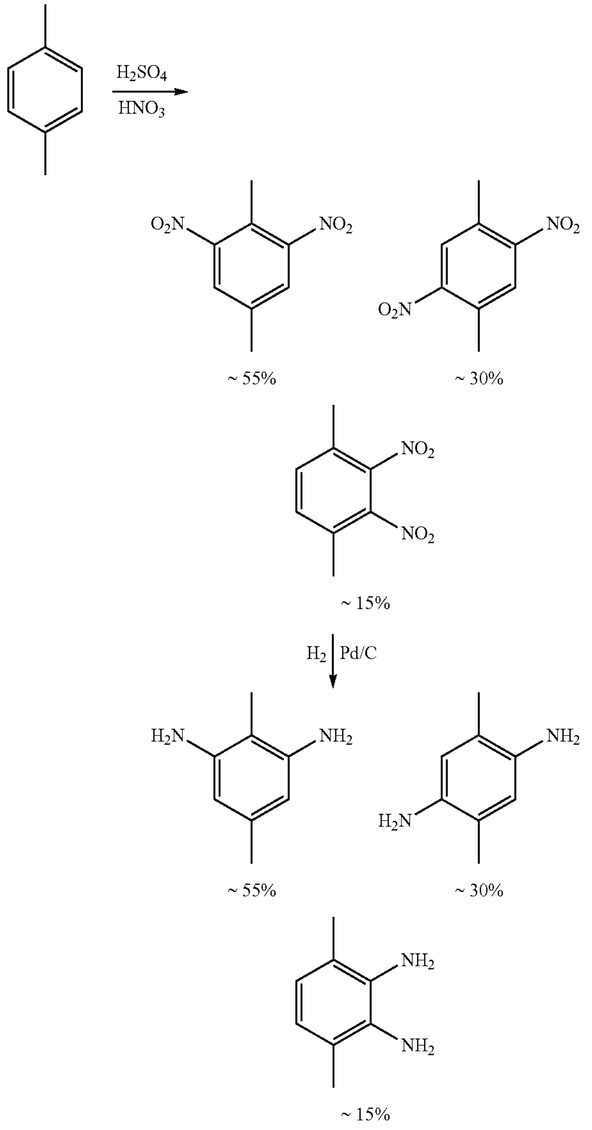

Reaction 6 shows the nitration of tetrahydronaphthalene, corresponding to Step (1) above, to a mixture of nitrated tetrahydronaphthalene compounds and the subsequent hydrogenation, corresponding to Step (2) above, of the nitrated tetrahydronaphthalene compounds to an isomeric mixture of aromatic diamine monomers. The molar fraction of each isomer is generally related to reaction kinetics and reaction conditions and may vary depending of the particular reaction conditions selected.

Reaction 6

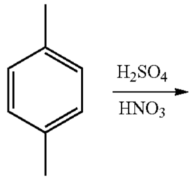

-continued

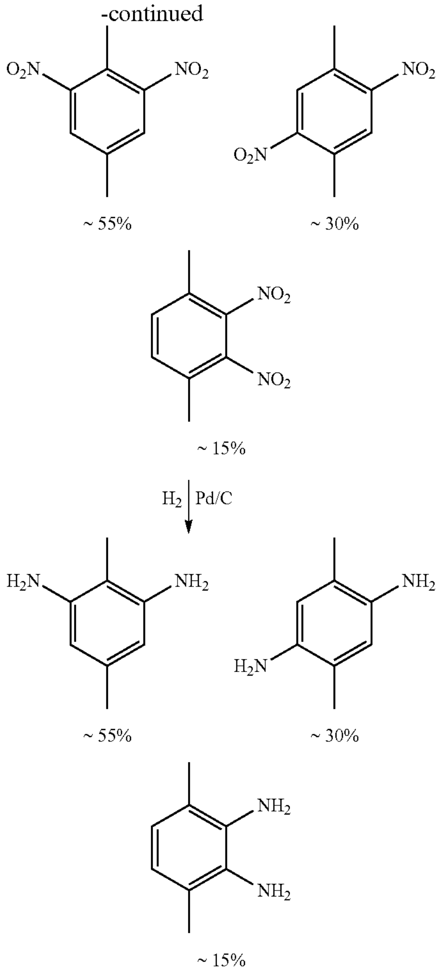

Reaction 7 shows the nitration of naphthalene, corresponding to Step (1) above, to a tri-nitrated naphthalene compound and the subsequent hydrogenation, corresponding to Step (2) above, of the tri-nitrated naphthalene compound to an aromatic triamine monomer. While illustrated in Reaction 7 as a triamine compound, diamines are may also be formed by varying reaction conditions.

Reaction 7

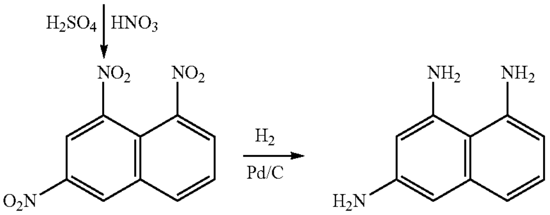

Reaction 8 shows the nitration of methyl naphthalene, corresponding to Step (1) above, to a tri-nitrated methyl naphthalene compound and the subsequent hydrogenation, corresponding to Step (2) above, of the tri-nitrated methyl naphthalene compound to an aromatic triamine monomer.

Reaction 8

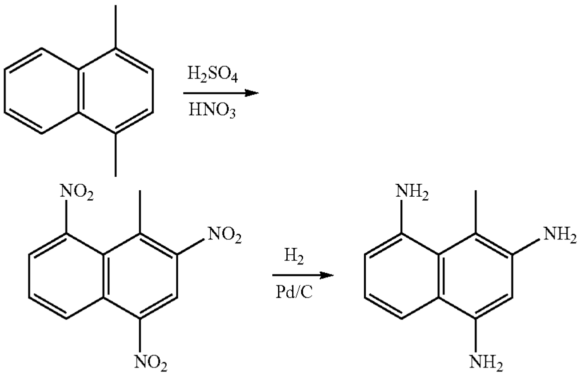

Reaction 9 shows the nitration of biphenyl, corresponding to Step (1) above, to a tri-nitrated biphenyl compound and the subsequent hydrogenation, corresponding to Step (2) above, of the tri-nitrated biphenyl compound to an aromatic triamine monomer.

Reaction 9

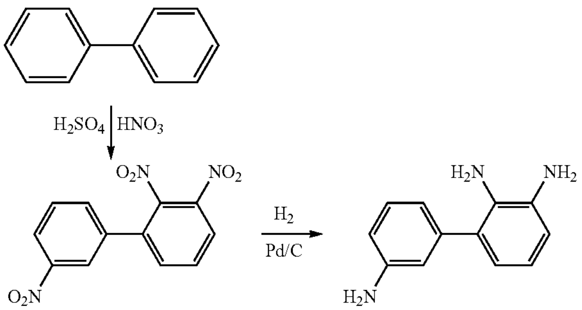

Reaction 10 shows the nitration of dimethyl biphenyl, corresponding to Step (1) above, to a tri-nitrated dimethyl biphenyl compound and the subsequent hydrogenation, corresponding to Step (2) above, of the tri-nitrated dimethyl biphenyl compound to an aromatic triamine monomer.

Reaction 10

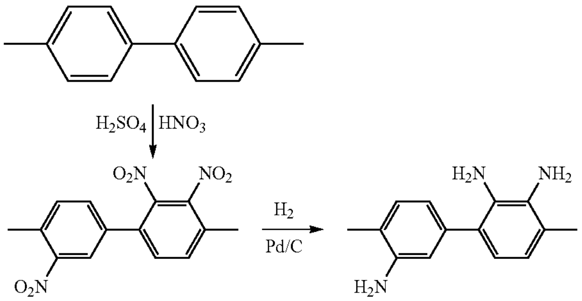

Reaction 11 shows the nitration of Aromatic 200 fluid, available from ExxonMobil Chemical. Aromatic 200 fluid is a mixture of aromatic hydrocarbons obtained from distillation of aromatic streams derived from crude oil and is characterized as having C10-C13 aromatics with a naphthalene content of less than 1%. The Aromatic 200 fluid may be nitrated, in accordance with Step (1) above, to a mixture of poly-nitrated aromatic compounds which may then be subsequently be hydrogenated, according to Step (2) above, to produce a mixture of aromatic poly-amines corresponding to the mixture of poly-nitrated aromatic compounds.

Reaction 11

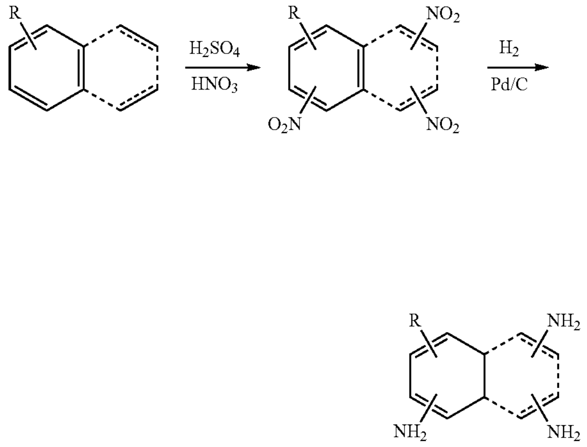

Reaction 12 shows a proposed reaction for the nitration and hydrogenation of a steam cracker tar. Steam cracker tar may vary widely in composition depending on the source of the steam cracker tar, but it generally referenced as is a recovered bottoms product in the first fractionator after a steam cracker in a refinery. Steam cracker tar will generally have a boiling point in excess of 288° C. The steam cracker tar may be nitrated, in accordance with Step (1) above, to a mixture of poly-nitrated aromatic compounds which may then be subsequently be hydrogenated, according to Step (2) above, to produce a mixture of aromatic poly-amines corresponding to the mixture of poly-nitrated aromatic compounds.

Reaction 12

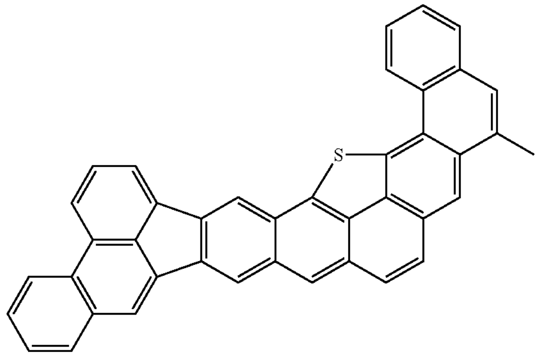

Proposed structure for Steam Cracker Tar

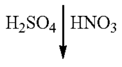

-continued

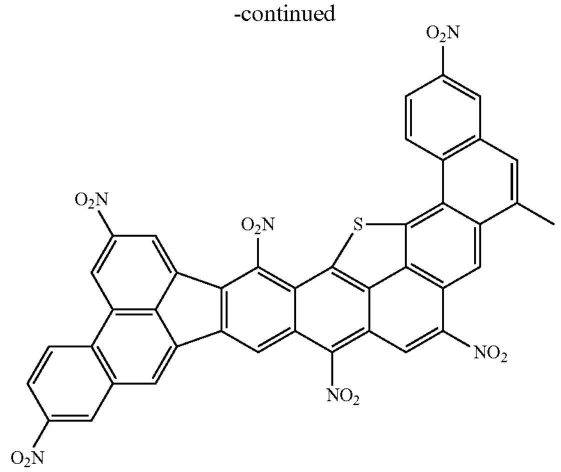

Nitrated Steam Cracker Tar

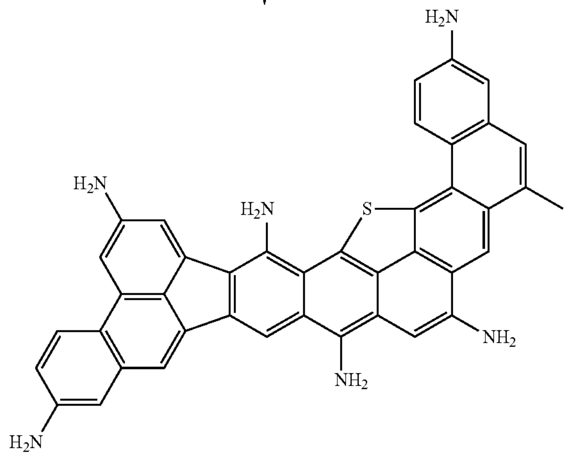

Multi amine functional Steam Cracker Tar

As mentioned above, the aromatic feed to Step (1) may be from any suitable source. In some embodiments an aromatic feed may be from a solvent assisted tar conversion process, sometimes referred to as SATC. Pyrolysis tar is a form of tar produced by hydrocarbon pyrolysis. One form of pyrolysis tar, steam cracker tar ("SCT"), contains a plurality of component species including high molecular weight molecules such as asphaltenes that are generated during the pyrolysis process and typically boil above 560° F. These asphaltenes molecules have low H/C and high sulfur content which contributes to high viscosity and high density of SCT. Solvent Assisted Tar Conversion (SATC) is an SCT upgrading process that includes mixing SCT with a utility fluid and upgrading the mixture into less viscous and less dense products including a hydroprocessed tar and solvent. At least a portion of the solvent can be recovered and recycled to the process, and the utility fluid can comprise recycled solvent. The upgrading can include cracking and hydroprocessing, e.g., one or more of thermal cracking, hydrocracking, and hydrogenation. The process is typically carried out under pressure and weight hourly space velocity ("WHSV") conditions that are selected to optimize one or more of SCT conversion, hydroprocessed tar yield/quality, and solvent yield/and quality. Operating temperature is also an important process parameter that can be adjusted to maintain the desired solvent quality. While the hydrogenation of aromatic molecules is favored when hydroprocessing at lower temperature (e.g., about 300° C.), a lesser amount of cracking occurs. This will increase the partially and/or completely hydrogenated molecules in the product which will eventually be present in recycle solvent after distillation. The increase in number of hydrogenated molecules in recycle solvent decreases the solvency power of the recycle solvent, in turn, reduces the ability of the recycle solvent to dissolve tar components. Another feature of SATC is the recycle of a cut of self-generated product as solvent. The amount of solvent recycled for use as utility fluid is typically about 20 wt. % to about 60 wt. %, e.g., about 40 wt. %. Solvent recovered from a SATC process typically has a desirably high solvency power, as indicated by the solvent's appreciable solubility blending number (SBN). If the SBN of the recovered solvent is less than 100, such as about 80 or about 90, the recycle solvent has a decreased ability to dissolve the tar and is therefore less desirable for use as utility fluid or utility fluid constituent.

In some embodiments, the aromatic feed to Step (1) may be from other sources with tar material content such as an atmospheric column bottoms stream, sometimes referred to as main column bottoms. Another source of aromatic feed to Step (1) may be from a vacuum distillation tower bottoms, sometimes referred to as a vac resid stream.

Step (3) above may include any number of processes which take as input the mixture of aromatic amine monomers produced in Step (2) and further process the aromatic amine monomers to a desired product. Some exemplary processes which may be used in Step (3) may include, but are not limited to, functionalization of the aromatic amine monomers to a different functional group, polymerization of the mixture of aromatic amine monomers to form a polymerized product through step growth polymerization, using the mixture of aromatic amine monomers to capture H2S, curing an epoxy resin, gelatinizing and waterproofing explosive compositions, and inclusion as antioxidant additives for lubrication applications, for example.

Reaction 13 shows a reaction scheme whereby a mix of dinitroaromatic amines is converted to a mix of diamino aromatics, which is then further reacted with phosgene to produce an isomeric mix of carbonyl chloride which is then further reacted to produce mix of aromatic diisocyanate. A mixed feed comprising dinitroaromatic compounds may be used as a gelatinizing and waterproofing agent in an explosive composition, for example. Multinitration to trinitroaromatics, an explosive similar to trinitrotoluene (TNT) used in military and civilian applications. The mixed nitroaromatics may be safer than picric acid because it may not form detonation-sensitive salts with metals and a lower melting point so that it can be conveniently loaded into shells or other containers in the molten state.

Reaction 13

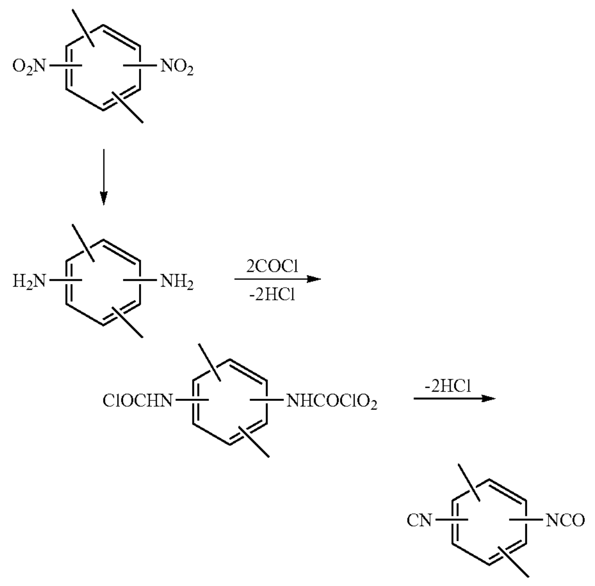

Another use for the isomeric mixture of aromatic amine monomers produced in Step (2) may be the production of polymers. Bifunctional isomeric mixtures of aromatic amine monomers which comprise two amine groups per molecule may be used to produce thermoplastics through step growth polymerization, for example. Trifunctional or higher functionality isomeric mixtures of aromatic amine monomers may be used to produce polymers whereby crosslinks between the oligomers in solution are formed. Polymerization of the isomeric amine monomers from Step (2) may be versatile approach to synthesize novel high-performance polymers with improved properties. The mixed aromatic amines may be copolymerized with aliphatic or aromatic acid chlorides using step-growth polymerization to obtain mixed polyamides. Further, the polymers produced by the isomeric aromatic amine monomers produced from Step (2) may have increased asymmetry in the produced the polymer backbone, and thus, the processability of the polymers in bulk or solution may be improved.

Reaction 14 illustrates a generic reaction for polymerizing a generic aromatic amine monomer with an alkyl diacyl halide to produce a polymerized product. The aromatic amine monomer may comprise one or more hydrocarbyl (R) substituent groups and comprise one, two, or three amine groups. The alkyl diacyl halide may comprise any suitable halogen (x) such as chlorine, bromine, or iodine and have any alkyl length (n) between n=1 and n=20, for example.

Reaction 14

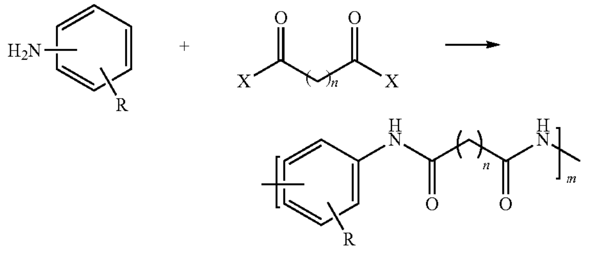

Reaction 15 illustrates a reaction of an isomeric mix of aromatic diamine monomer prepared by nitrating benzene using Step (1) above followed by hydrogenation using Step (2) above to produce the isomeric mix of aromatic amine monomer. Reaction 15, which may correspond to Step (3) above, shows the reaction of an isomeric mix of aromatic diamine monomers with an alkyl diacyl chloride to produce a polymerized product (P1). Although illustrated as alkyl diacyl chloride, any alkyl diacyl halide may be utilized. The alkyl diacyl halide may have any alkyl length (n) between n=1 and n=20, for example.

Reaction 15

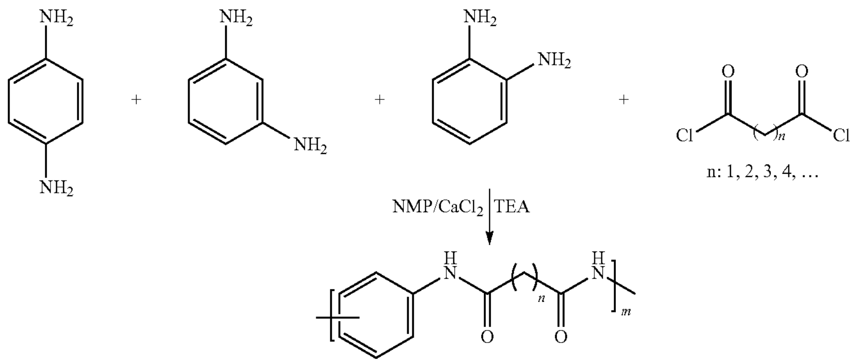

P1

Reaction 16 illustrates a reaction of an isomeric mix of aromatic diamine monomer prepared from o-xylene as in Reaction 3. Reaction 16, which may correspond to Step (3) above, shows the isomeric mix of aromatic diamine monomers may be reacted with an alkyl diacyl chloride to produce a polymerized product (P2). Although illustrated as alkyl diacyl chloride, any alkyl diacyl halide may be utilized. The alkyl diacyl halide may have any alkyl length (n) between n=1 and n=20, for example.

Reaction 16

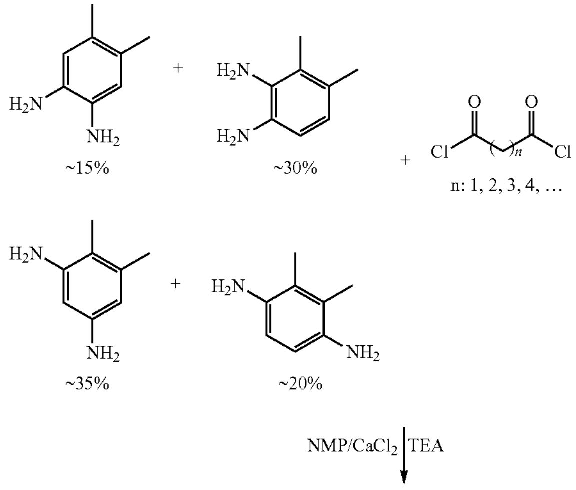

-continued

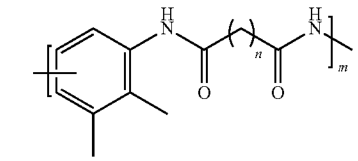

P2

Reaction 17 illustrates a reaction of an isomeric mix of aromatic diamine monomer prepared from m-xylene as in Reaction 4. Reaction 17, which may correspond to Step (3) above, shows the isomeric mix of aromatic diamine monomers may be reacted with an alkyl diacyl chloride to produce a polymerized product (P3). Although illustrated as alkyl diacyl chloride, any alkyl diacyl halide may be utilized. The alkyl diacyl halide may have any alkyl length (n) between n=1 and n=20, for example.

Reaction 17

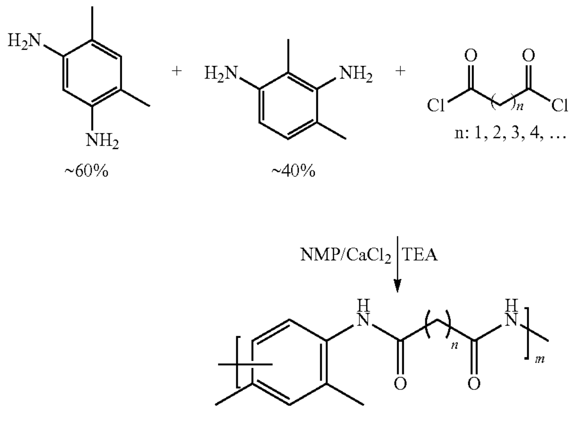

P3

Reaction 18 illustrates a reaction of an isomeric mix of aromatic diamine monomer prepared from p-xylene as in Reaction 5. Reaction 18, which may correspond to Step (3) above, shows the isomeric mix of aromatic diamine monomers may be reacted with an alkyl diacyl chloride to produce a polymerized product (P4). Although illustrated as alkyl diacyl chloride, any alkyl diacyl halide may be utilized. The alkyl diacyl halide may have any alkyl length (n) between n=1 and n=20, for example.

Reaction 18

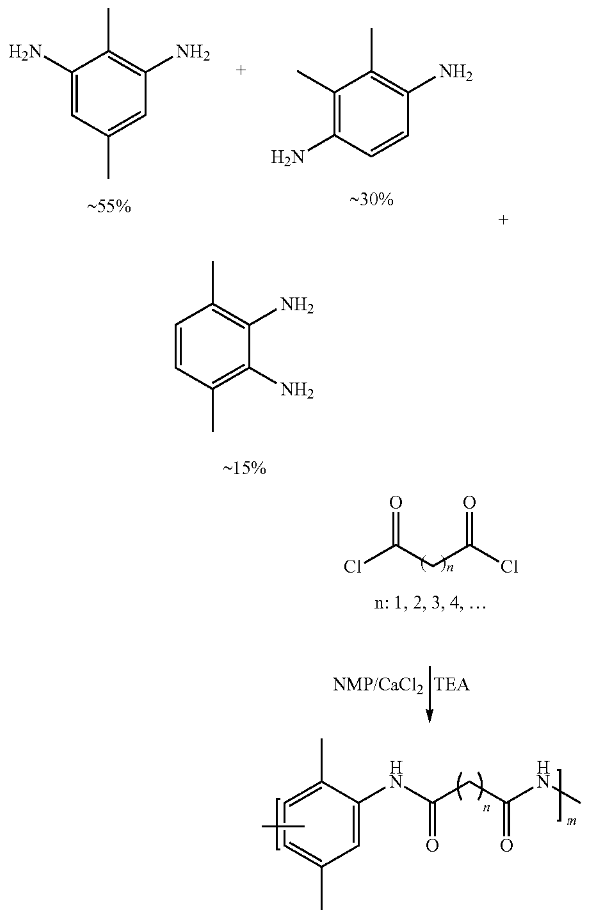

P4

Reaction 19 illustrates a reaction of an isomeric mix of aromatic diamine monomers prepared from naphthalene using Step (1) and (2) above. Reaction 19, which may correspond to Step (3) above, shows the isomeric mix of aromatic diamine monomers may be reacted with an alkyl diacyl chloride to produce a polymerized product (P5). Although illustrated as alkyl diacyl chloride, any alkyl diacyl halide may be utilized. The alkyl diacyl halide may have any alkyl length (n) between n=1 and n=20, for example.

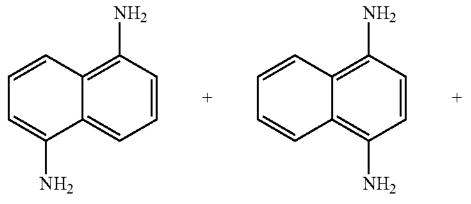

-continued

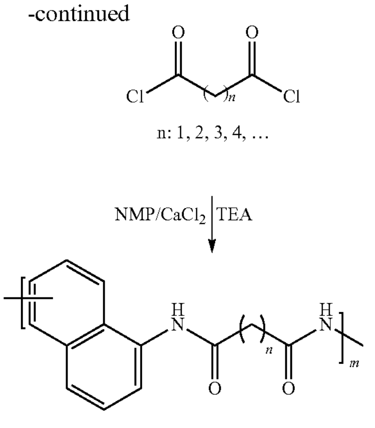

P5

Reaction 20 illustrates a reaction of an isomeric mix of aromatic diamine monomers prepared from naphthalene using Step (1) and (2) above. Reaction 20, which may correspond to Step (3) above, shows the isomeric mix of aromatic diamine monomers may be reacted with an alkyl diacyl chloride to produce a polymerized product (P6). Although illustrated as alkyl diacyl chloride, any alkyl diacyl halide may be utilized. The alkyl diacyl halide may have any alkyl length (n) between n=1 and n=20, for example.

Reaction 20

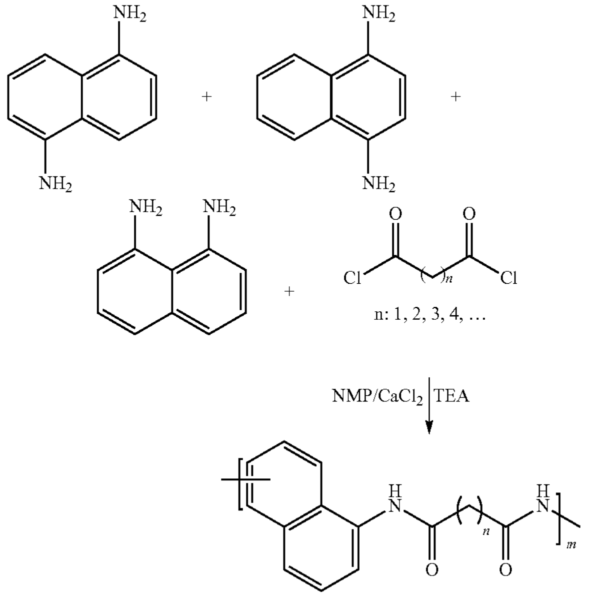

P6

Reaction 21 illustrates a reaction of a mix of naphthalene diamine, biphenyl diamine, and phenyl diamine monomers prepared from naphthalene and benzene using Step (1) and (2) above and biphenyl as in Reaction 9 above. Reaction 21, which may correspond to Step (3) above, shows the isomeric mix of mix of naphthalene diamine, biphenyl diamine, and phenyl diamine may be reacted with an alkyl diacyl chloride to produce a polymerized product (P7). Although illustrated as alkyl diacyl chloride, any alkyl diacyl halide may be utilized. The alkyl diacyl halide may have any alkyl length (n) between n=1 and n=20, for example.

Reaction

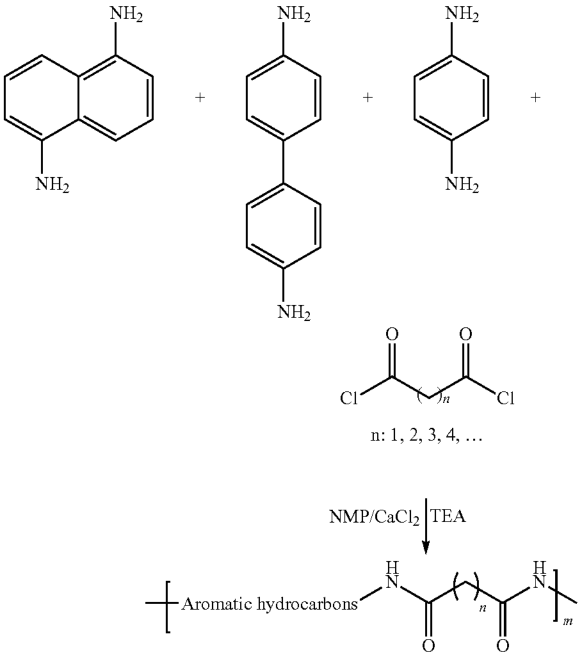

P7

Reaction 22 illustrates a reaction of an isomeric mix of aromatic diamine monomer prepared from tetrahydronaphthalene as in Reaction 6. Reaction 22, which may correspond to Step (3) above, shows the isomeric mix of aromatic diamine monomers may be reacted with an alkyl diacyl chloride to produce a polymerized product (P8). Although illustrated as alkyl diacyl chloride, any alkyl diacyl halide may be utilized. The alkyl diacyl halide may have any alkyl length (n) between n=1 and n=20, for example.

Reaction 22

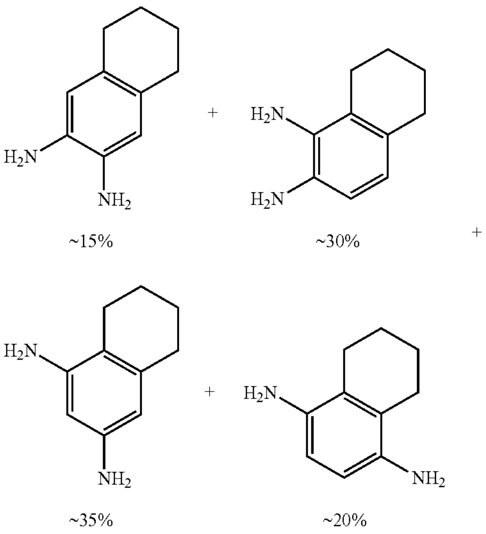

-continued

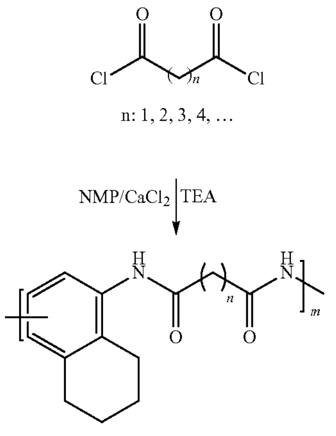

P8

Reaction 23 illustrates a reaction of a phenanthrene diamine monomer prepared from phenanthrene using Step (1) and (2) above. Reaction 23, which may correspond to Step (3) above, shows the phenanthrene diamine monomer may be reacted with an alkyl diacyl chloride to produce a polymerized product (P9). Although illustrated as alkyl diacyl chloride, any alkyl diacyl halide may be utilized. The alkyl diacyl halide may have any alkyl length (n) between n=1 and n=20, for example.

Reaction 23

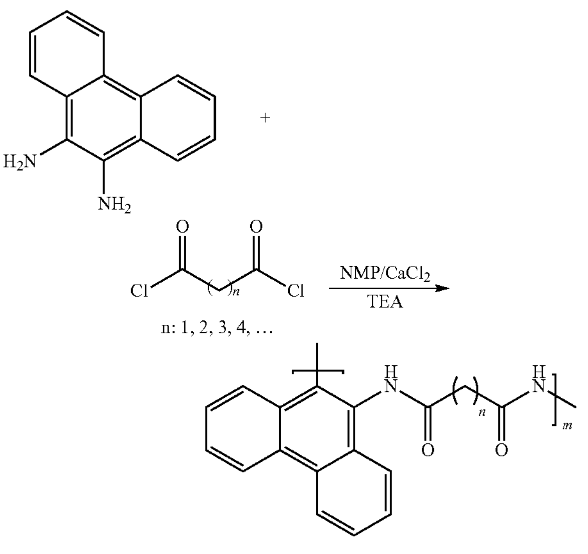

P9

Reaction 24 illustrates a reaction of an isomeric mix of aromatic diamine monomer prepared by nitrating benzene using Step (1) above followed by hydrogenation using Step (2) above to produce the isomeric mix of aromatic amine monomer. Reaction 24, which may correspond to Step (3) above, shows the reaction of an isomeric mix of aromatic diamine monomers with an aromatic diacyl chloride to produce a polymerized product (P10). Although illustrated as aromatic diacyl chloride, any aromatic diacyl halide may be utilized.

Reaction 24

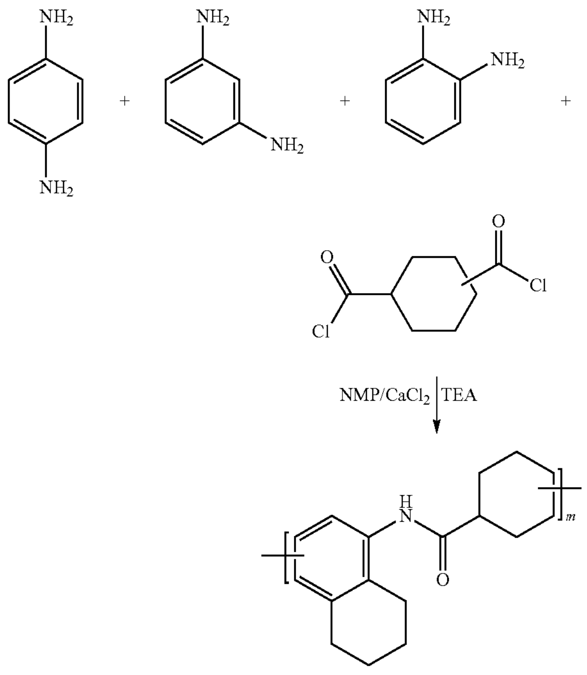

P10

Reaction 25 illustrates a reaction of a mix of naphthalene diamine, biphenyl diamine, and phenyl diamine monomers prepared from naphthalene and benzene using Step (1) and (2) above and biphenyl as in Reaction 9 above. Reaction 25, which may correspond to Step (3) above, shows the isomeric mix of mix of naphthalene diamine, biphenyl diamine, and phenyl diamine may be reacted with an aromatic diacyl chloride to produce a polymerized product (P11). Although illustrated as aromatic diacyl chloride, any aromatic diacyl halide may be utilized.

Reaction 25

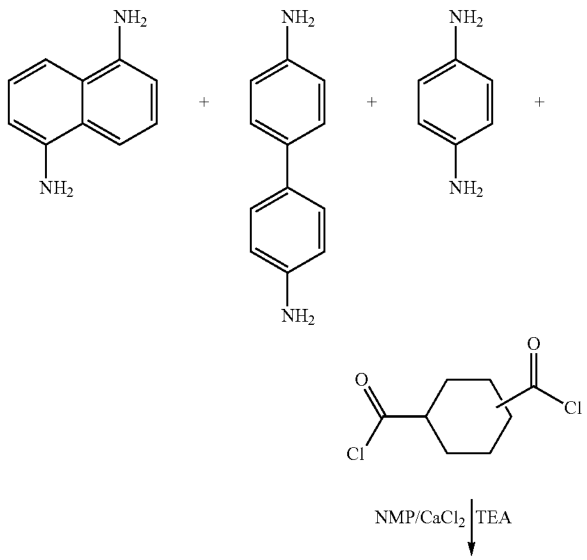

-continued

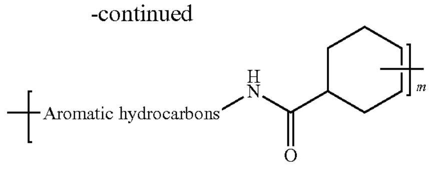

P11

Although Reactions 14-25 are illustrated as reacting an aromatic amine monomer with an aromatic diacyl halide or an alkyl diacyl halide, carboxylic acids, including aliphatic dicarboxylic acids, may also be used. Some examples of aliphatic dicarboxylic acids may include linear aliphatic dicarboxylic acids with the general formula $HO_2C(CH_2)_nCO_2H$ where n may be in an inclusive range from 0 to 10 such as 0, 1, 2, 3, 4, 5, 6, 7, 8, 9, or 10. The polymers produced from the methods discussed herein may have tunable properties such as tunable glass transition temperature. One method to tune glass transition temperature and other properties may be to select an alkyl diacyl halide with has the desired alkyl chain length to promote desired properties. For example, selecting an alkyl diacyl halide with a relatively shorter chain length may make the resulting polymer for rigid as well as raise the glass transition temperature of the resulting polyamide and the polyamide may have more aromatic properties. Conversely, selecting an alkyl diacyl halide with a relatively longer chain length may decrease the rigidity as well as decrease the glass transition temperature and reduce the aromatic properties of the polymer. Another method of tuning the glass transition temperature may be to select aromatic amine monomers such that the mixture of aromatic amine monomers forms a polyamide with the desired glass transition temperature. As will be shown in the Examples below, the glass transition temperature for the polyamide is dependent upon the monomers and mass fractions thereof selected to produce the polyamide. For example, a first aromatic amine monomer which produces a polyamide with a relatively lower glass transition temperature and a second aromatic amine monomer which produces a polyamide with a relatively higher glass transition temperature may produce a polyamide with an intermediate glass transition temperature when the first aromatic amine monomer and the second aromatic amine monomer are combined to produce the polyamide with an intermediate glass transition temperature. In some embodiments, three or more aromatic amine monomers may be combined to and polymerized to produce a polyamide with properties of each of the three or more aromatic amine monomers.

Other methods to tune properties such as glass transition temperature may include selecting aromatic amine monomers which produce polyamides with relatively more or relatively less regularity. For example, polyamides synthesized from aromatic diamine monomers which have been produced from p-xylene may be expected to have more regularity which may increase pi stacking in the polyamide and result in relatively higher glass transition temperatures. Conversely, polyamides synthesized from aromatic diamine monomers which have been produced from o-xylene and p-xylene may be expected to have less regularity which may reduce pi stacking in the polyamide and result in relatively lower glass transition temperatures. One method to tune for glass transition temperature may be to select aromatic diamine monomers or a combination of aromatic diamine monomers such that a desired glass transition temperature is produced when the combination of aromatic di amine monomers are polymerized.

As mentioned above, Step (3) may include functionalizing any of the aromatic amine monomers produced in Step (2) to produce aromatic compounds with different functional groups. Some exemplary functionalization steps may include any of the following reactions illustrated in Reactions 26-31 for example. Although the illustrated reactions are for phenylamine with only one amine group, the same reactions may be applied to any aromatic polyamine monomers produced in Step (2).

Reaction 26

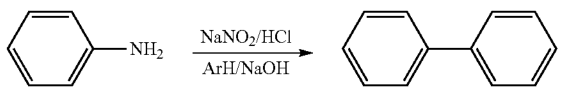

Reaction 27

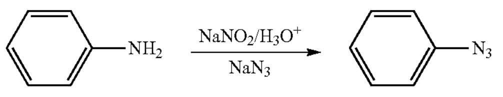

Reaction 28

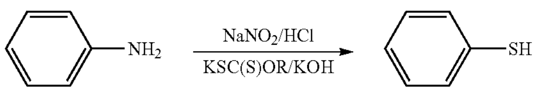

Reaction 29

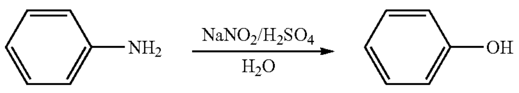

Reaction 30

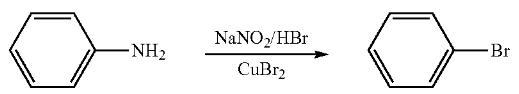

Reaction 31

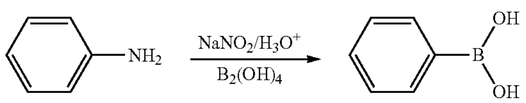

Example 1

In these Example, nitration of aromatic hydrocarbons to nitro aromatic compounds and catalytic hydrogenation of the nitrated aromatic compounds was performed and the results of the nitration were verified by laboratory analysis. The procedure for each aromatic hydrocarbon tested was carried out as follows, 20 mL sulfuric acid (98%) and 20 mL nitric acid (70%) were measured into a round bottom flask in an ice-water bath. Aromatic hydrocarbon (5 g) was added to the mixture in portions. A variety of aromatic hydrocarbons were tested as will be discussed below. After addition of the aromatic hydrocarbon, the reaction mixture was allowed to warm to room temperature and was allowed to stir overnight. The reaction mixture was poured into ice/water. The product was isolated by filtration and dried. The nitrated aromatic hydrocarbon (5 g, 25.5 mmol) and 10% Pd/C (0.26 g, 2.5 mmol) were added to 150 mL ethanol in a Parr hydrogenation apparatus. The mixture was hydrogenated overnight at 50 psi $H_2$ on a Parr reactor equipped with a mechanical stirrer at ambient temperature. The reaction mixture was thereafter filtered through diatomaceous earth and the solvents of the filtrate were removed under reduced pressure. The solid mixture was then washed with hot hexanes to remove trace impurities. The product mixtures were dried under vacuum at ambient temperature overnight and subjected to $^1$H NMR.

Figure 2:
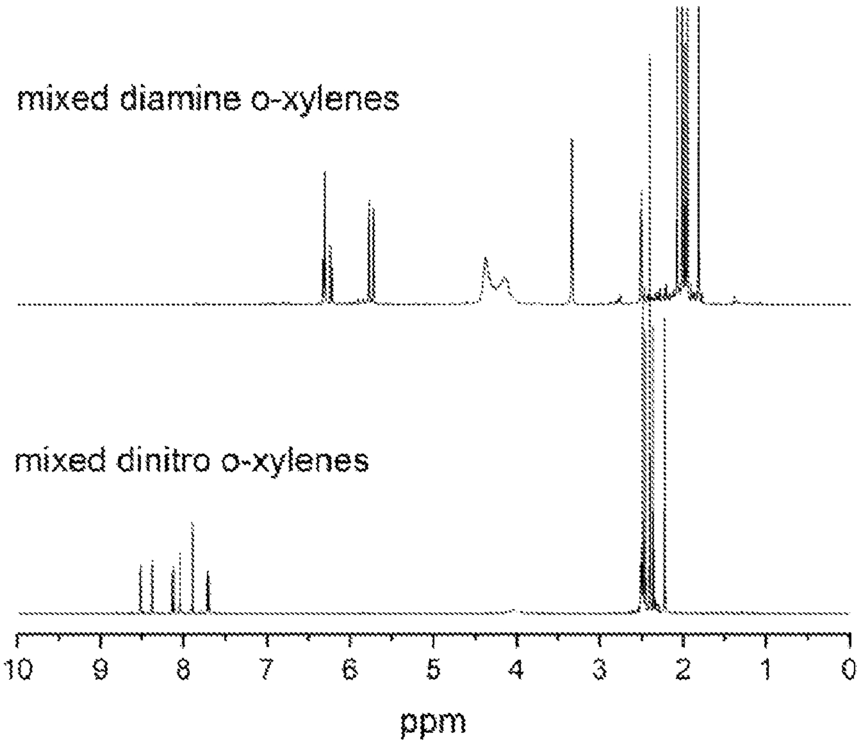
FIG. 2 are $^{1}H$ NMR spectra of mixed diamine o-xylenes and mixed dinitro o-xylenes.
Figure 3:
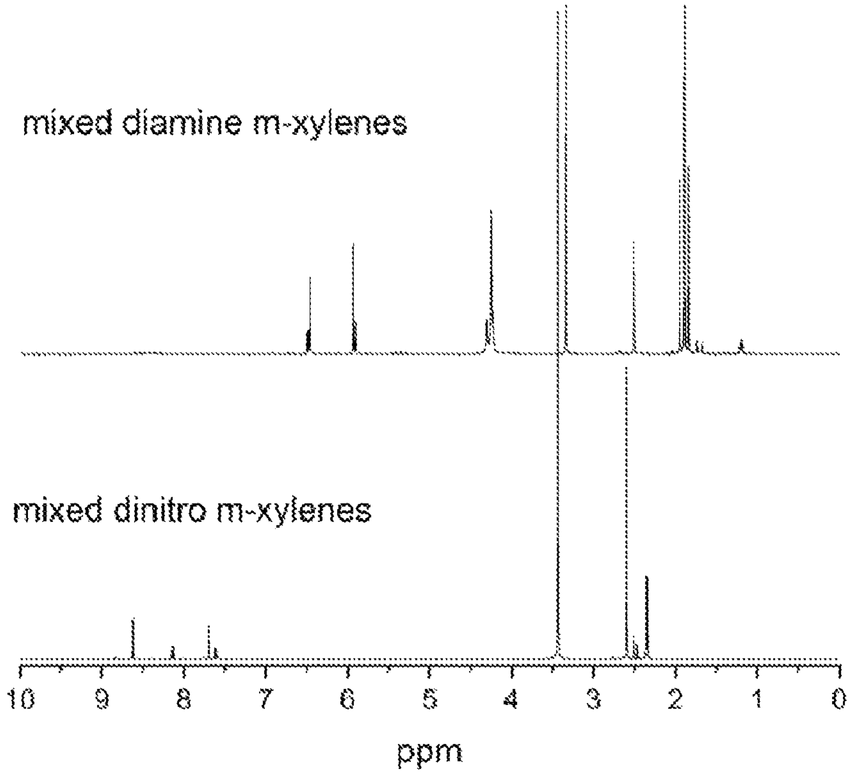
FIG. 3 are $^{1}H$ NMR spectra of mixed diamine m-xylenes and mixed dinitro m-xylenes.
Figure 4:
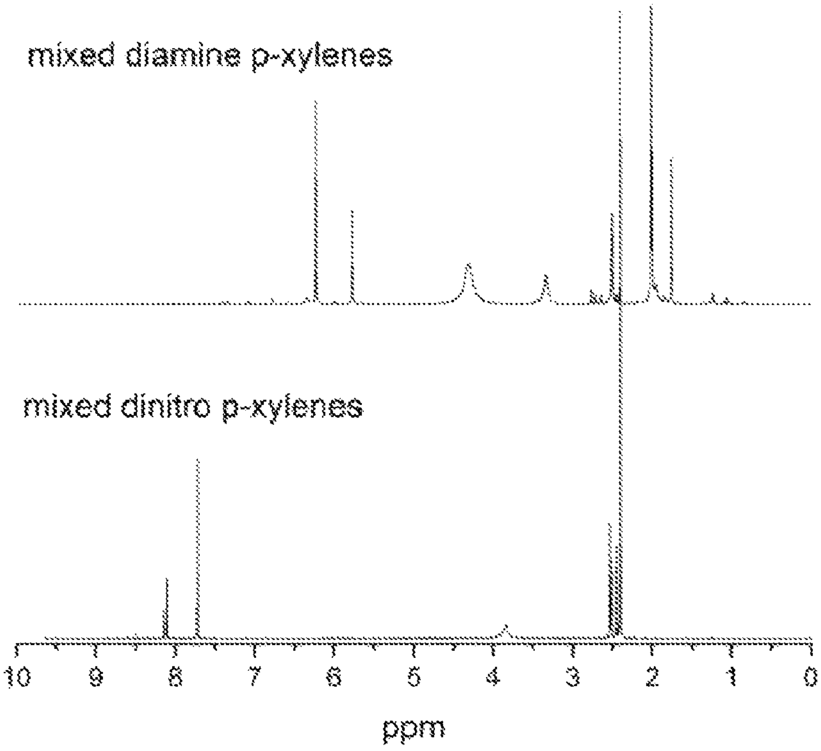
FIG. 4 are $^{1}H$ NMR spectra of mixed diamine p-xylenes and mixed dinitro p-xylenes.

Mixed aromatic diamine monomers were successfully synthesized using a two-step reaction starting from various xylene derivatives via electrophilic aromatic substitution reaction followed by catalytic hydrogenation corresponding to Reactions 3-5 above. The electrophilic aromatic substitution was observed to produce a variety of isomeric mixture of dinitro xylenes. The chemical structure and composition of the dinitro compounds derived from xylenes were confirmed by $^1$H NMR. FIG. 2 are $^1$H NMR of mixed diamine o-xylenes and mixed dinitro o-xylenes, FIG. 3 are $^1$H NMR of mixed diamine m-xylenes and mixed dinitro m-xylenes, and FIG. 4 are $^1$H NMR of mixed diamine p-xylenes and mixed dinitro p-xylenes. It can be observed from FIGS. 2-4 that the $^1$H NMR spectra agree with the proposed structures. Further, it can be observed from the $^1$H NMR spectra of FIGS. 2-4 that the nitration products of o-xylene were mainly 1,2-dimethyl-3,5-dinitrobenzene (40%) and 1,2-dimethyl-3,4-dinitrobenzene (35%) with lower levels of 2,3-dimethyl-1,4-dinitrobenzene (15%) and 1,2-dimethyl-4,5-dinitrobenzene (10%). The nitration products of m-xylene were two different 2,4-dinitro m-xylenes in the presented including 1,5-dimethyl-2,4-dinitrobenzene, and 1,3-dimethyl-2,4-dinitrobenzene (40%). The nitration of p-xylene generated three different isomeric species including 2,5-dimethyl-1,3-dinitrobenzene (55%), 1,4-dimethyl-2,5-dinitrobenzene (30%), and 1,4-dimethyl-2,3-dinitrobenzene (15%). In addition, the small amounts of trinitro-xylenes were also detected when the reaction was performed at elevated temperatures. It was observed that the desired mixed aromatic diamine monomers were readily obtained in high yields by the catalytic hydrogenation of the intermediate dinitro compounds using (10%) Pd/C in a Parr reactor. The $^1$H NMR spectra of diamines generated from o, m, p-xylenes are shown in FIGS. 2-4 indicate that the synthesis of the desired diamine monomers was readily achieved using the methods described. The resonance signal of aromatic protons shifted to higher field (from 7.5-8.5 ppm to 5.5-6.5 ppm) and peak around 4 ppm which are attributed to the protons of the amino groups synthesized.

Example 2

Figure 5:
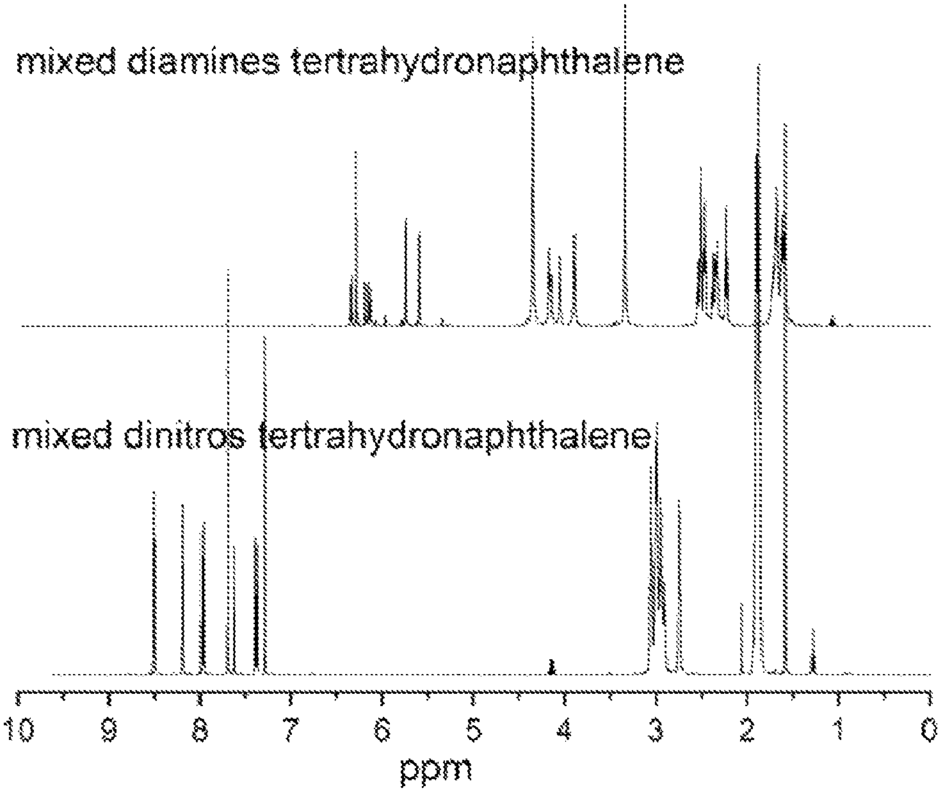
FIG. 5 are $^{1}H$ NMR spectra of mixed diamines tetrahydronaphthalene and mixed dinitro tetrahydronaphthalene.

Mixed aromatic diamine monomers were successfully synthesized by using a two-step reaction starting from tetrahydronaphthalene corresponding to Reaction 6 above. The starting material for synthesis of diamine tetrahydronaphthalene was tetrahydronaphthalene. A mixture of the dinitro tetrahydronaphthalenes was obtained by using nitric acid in sulphuric acid at ambient temperature. The chemical structure and composition of the dinitro tetrahydronaphthalene compounds were confirmed by $^1$H NMR spectra shown in FIG. 5. The $^1$H NMR spectra indicated a similar composition to the nitrated o-xylene for tetrahydronaphthalene under the same reaction conditions as 5,7-dinitro-1,2,3,4-tetrahydronaphthalene (40%), 5,6-dinitro-1,2,3,4-tetrahydronaphthalene (36%), 5,8-dinitro-1,2,3,4-tetrahydronaphthalene(15%), 6,7-dinitro-1,2,3,4-tetrahydronaphthalene (10%). The mixture of the dinitro tetrahydronaphthalenes were hydrogenated in the Parr reactor using of Pd/C to obtain diamine-functionalized tetrahydronaphthalene. The aromatic protons of the diamine-tetrahydronaphthalene appeared between 5.5 and 6.5 ppm while protons of the amine moieties appeared between 3.5 and 4.5 ppm indicating the synthesis of the desired isomeric diamines mixture Example 3

Figure 6:
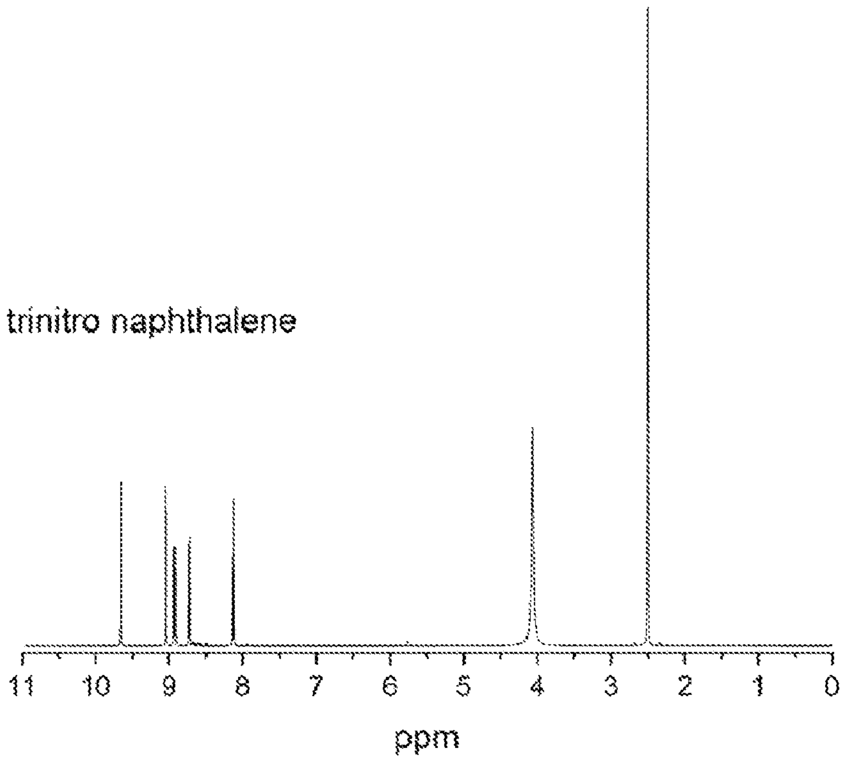
FIG. 6 are $^{1}H$ NMR spectra of trinitro naphthalene.
Figure 7:
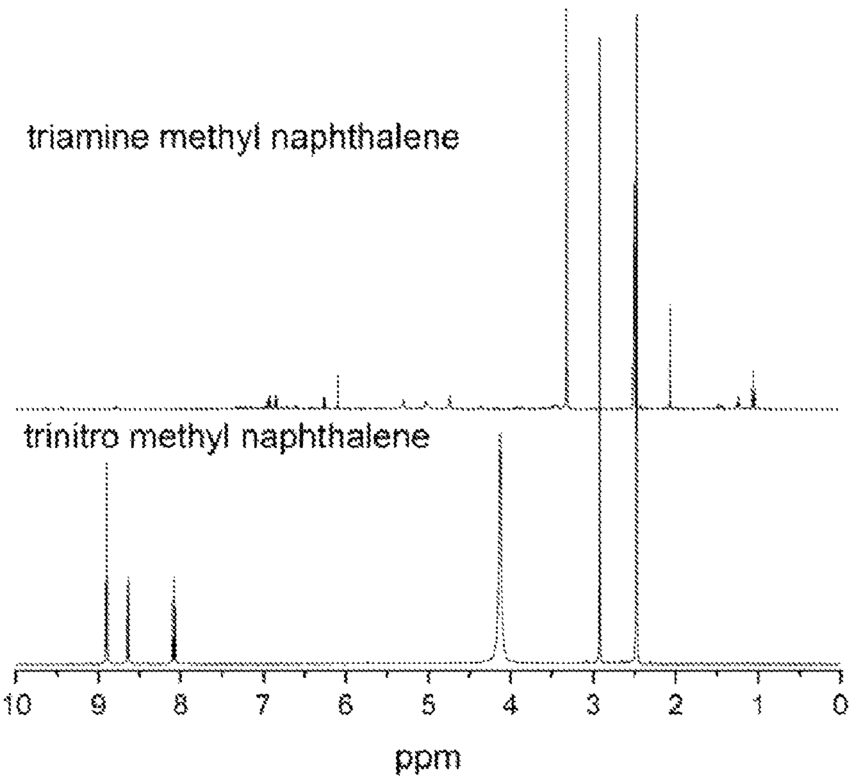
FIG. 7 are $^{1}H$ NMR spectra of triamine methyl naphthalene and trinitro methyl naphthalene.

The nitration of naphthalenes was carried out in a mixture of sulphuric acid and nitric acid at ambient temperature and subsequently the nitro groups were hydrogenated in the Parr reactor using Pd/C to obtain amine functionalized naphthalenes corresponding to Reactions 7 and 8 above. The chemical structures of nitrated compounds were analyzed by means of $^1$H NMR (FIG. 6 and FIG. 7). The results suggested that nitration of these naphthalenes by the conventional method gave pure trinitro naphthalenes and methyl naphthalene as 1,3,8-trinitronaphthalene and 1-methyl-2,4,8-trinitronaphthalene. The protons peaks at 5.5-6.5 ppm are ascribed to aromatic protons and the protons peaks ranged from 4.5 to 5.5 ppm are assigned to amine groups. The $^1$H NMR spectrum confirmed reduction of the nitrated naphthalenes to the amine-functionalized naphthalenes Example 4

Figure 8:
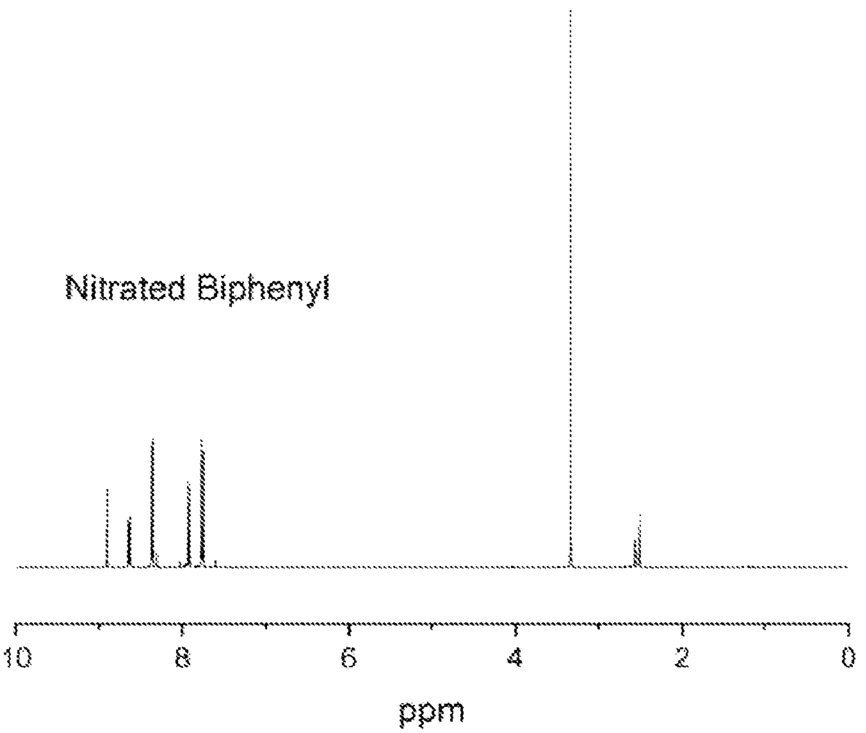
FIG. 8 is a $^{1}H$ NMR spectra of nitrated biphenyl.
Figure 9:
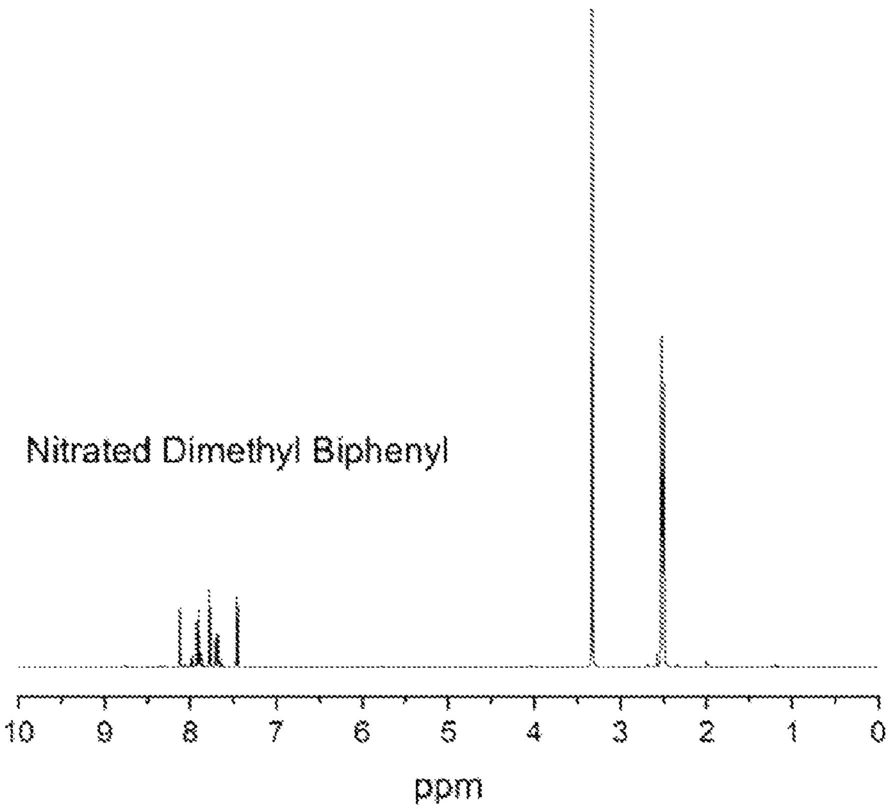
FIG. 9 is a $^{1}H$ NMR spectra of nitrated dimethyl biphenyl.

The nitration reaction of biphenyl and dimethyl biphenyl were procured in an analogous manner as xylenes and naphthalenes as shown in Reactions 9 and 10 above. The chemical structures of nitrated biphenyl and dimethyl biphenyl were confirmed by $^1$H NMR (FIG. 8 and FIG. 9). The resonance signal in the region at 7.5 and 8.2 ppm are assigned to aromatic protons of biphenyl or dimethyl biphenyl suggesting the insertion of three nitro groups on dimethyl biphenyl such as 4,4'-dimethyl-2,3,3'-trinitro-1,1'-biphenyl. The catalytic hydrogenation of the nitrated hydrocarbons was successfully used to obtain amine functionalized aromatic hydrocarbons.

Example 5

Figure 10:
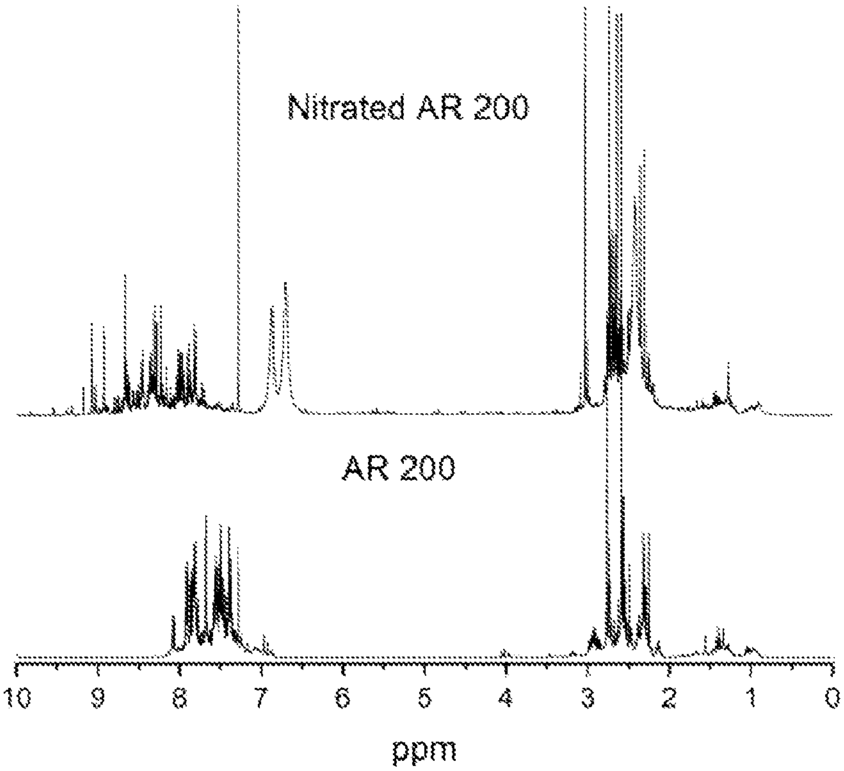
FIG. 10 are $^{1}H$ NMR spectra of nitrated AR 200 and AR 200.
Figure 11:
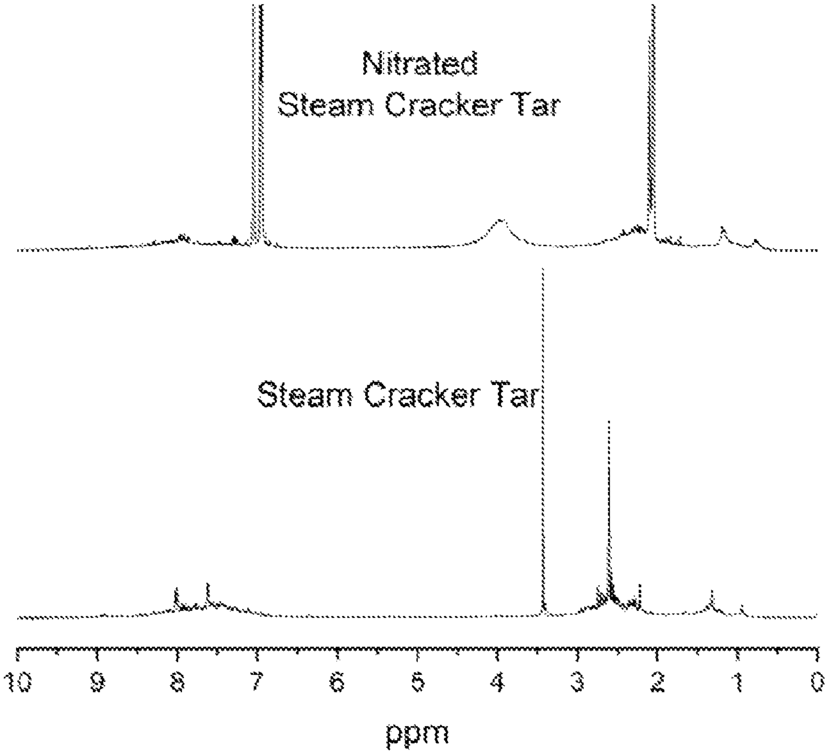
FIG. 11 are $^{1}H$ NMR spectra of nitrated steam cracker tar and steam cracker tar.

The nitration reaction of Step (1) was employed to nitrate AR 200 and Steam Cracker Tar corresponding to Reactions 11 and 12 above in the same fashion as nitration of xylenes and naphthalenes to afford the corresponding multi nitrated aromatic compounds. After the nitration reaction, the products are isolated as solids and analyzed by $^1$H NMR, the spectra of which are shown in FIG. 10 and FIG. 11. The $^1$H NMR spectra of the nitrated AR200 and SCT reveal a shift of the aromatic protons to lower field indicating the successful nitration of the aromatic rings. The catalytic hydrogenation of the nitrated hydrocarbons was successful to obtain polyamine functionalized aromatic hydrocarbons.

Example 6

In this Example, four reference polymers were synthesized according to reactions 26, 27, 28, and 29. Each of Reactions 32-35 illustrates a diamine polymerization. The procedure was carried out at follows, in a 100 ml. around bottom flask, equipped with a mechanical stirrer, diamine (20.0 mmol, 1 equiv.) was added. To the diamine, 25 mL of solvent (CaCl2/NMP, 5 wt. %) was added under nitrogen flow, and the mixture was stirred and heated to 70° C. for 30 min. until complete dissolution of the diamine was achieved. After mixing, dry Et3N (40 mmol, 1 equiv.) was added to the reaction mixture at room temperature. The reaction mixture was cooled with an ice bath. The diacyl chloride (20.0 mmol, 1 equivalent) was added dropwise directly to the mixture under vigorous stirring. After an hour of polymerization under continuous mechanical stirring, the reaction mixture was precipitated in water, filtered with a Buchner filter, and washed with methanol or acetone. The powders were dried overnight in vacuum at 80° C. for 24 h.

Reaction 32

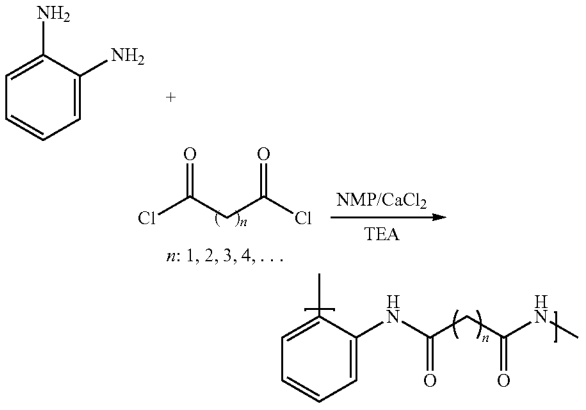

Reference Polymer 1

Reaction 33

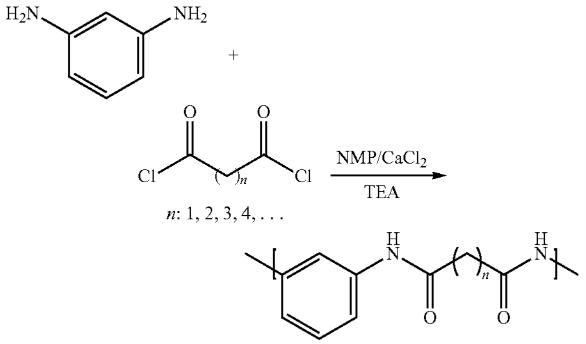

Reference Polymer 2

Reaction 34

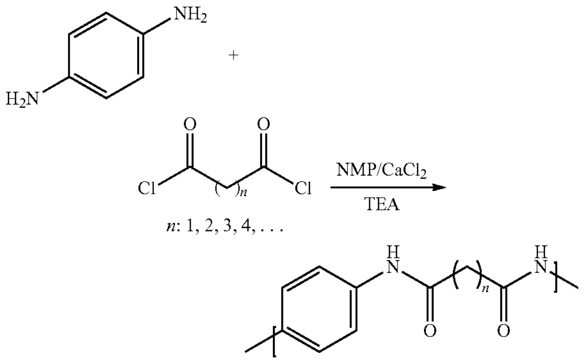

Reference Polymer 3

Reaction 35

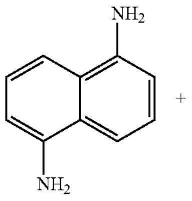

-continued

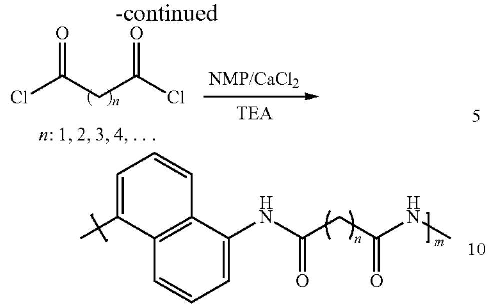

Reference Polymer 4

Example 7

In this example, isomeric semi-aromatic polymers were synthesized according to Reactions 15-25. In a 100 mL around bottom flask, equipped with a mechanical stirrer, mixed aromatic diamines (20.0 mmol. 1 equiv.) was added. To the diamine, 25 mL of solvent (CaCl2/NMP, 5 wt. %) was added under nitrogen flow, and the mixture was stirred and heated to 70° C. for 30 min. until complete dissolution of the diamine was achieved. After mixing, dry triethylamine (TEA) (Et3N) (40 mmol, 1 equiv.) was added to the reaction mixture at room temperature. The reaction mixture was cooled with an ice bath. The diacyl chloride (20.0 mmol, 1 equivalent) was added dropwise directly to the mixture under vigorous stirring. After an hour of polymerization under continuous mechanical stirring, the reaction mixture was precipitated in water, filtered with a Buchner filter, and washed with methanol or acetone. The powders were dried overnight in vacuum at 80° C. for 24 h.

Figure 12:
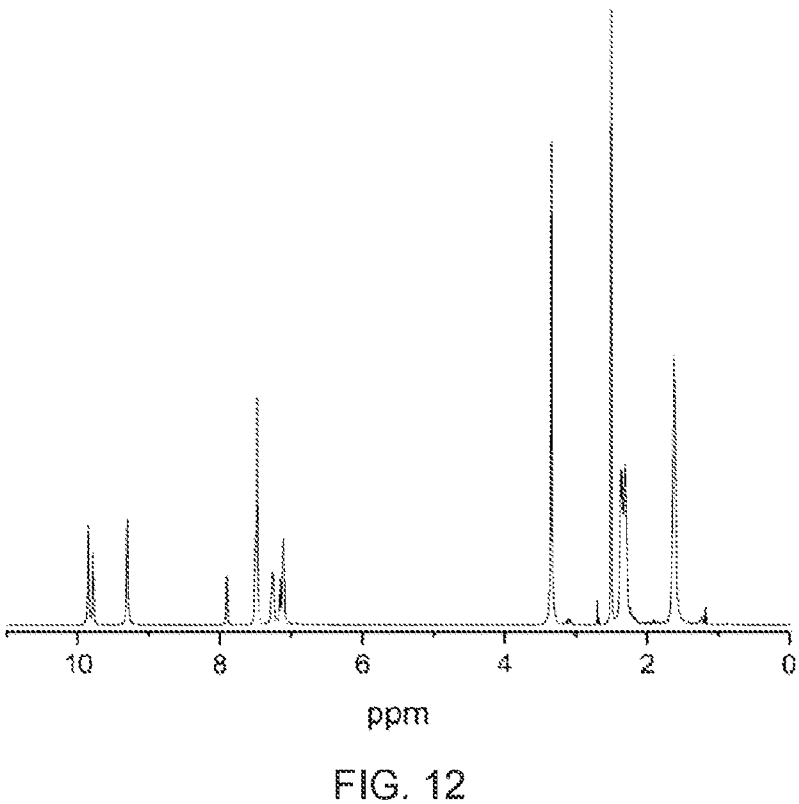
FIG. 12 is a $^{1}H$ NMR spectra polyamide copolymers of isomeric mixed aromatic diamines derived from benzene and alkyl diacyl chloride.
Figure 13:
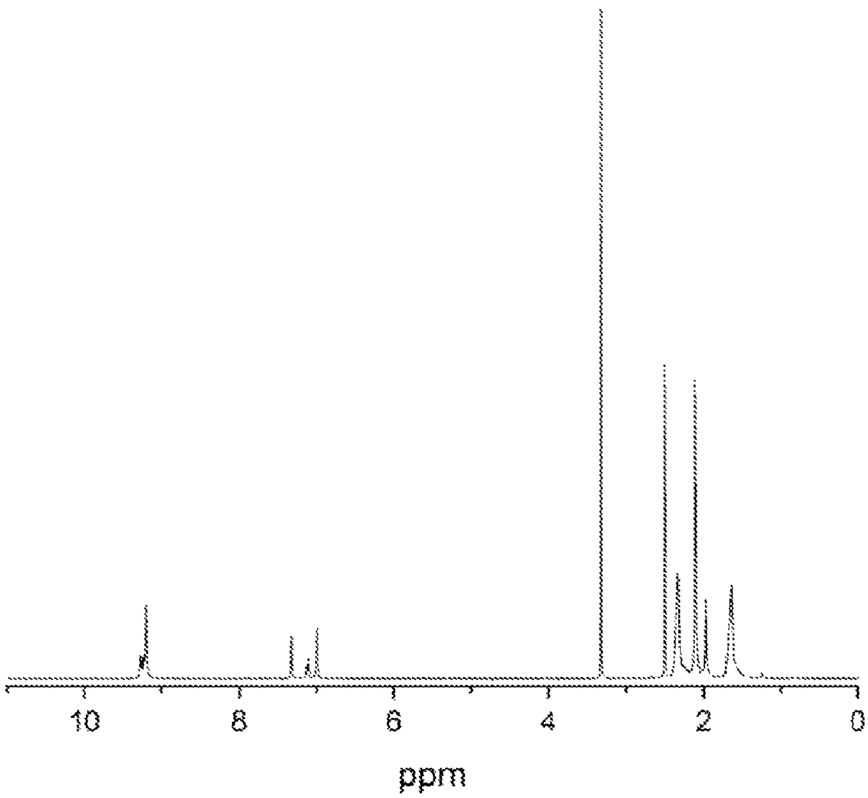
FIG. 13 is a $^{1}H$ NMR spectra polyamide copolymers of isomeric mixed aromatic diamines derived from m-xylene and alkyl diacyl chloride.
Figure 14:
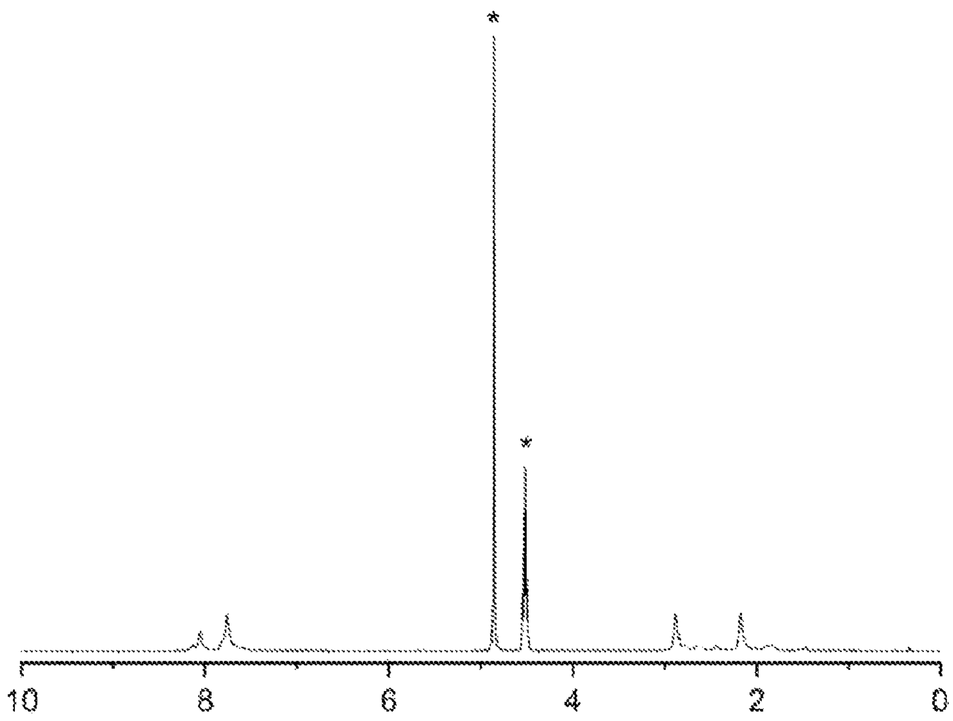
FIG. 14 is a $^{1}H$ NMR spectra polyamide copolymers of isomeric mixed naphthalene diamines derived from naphthalene and alkyl diacyl chloride.
Figure 15:
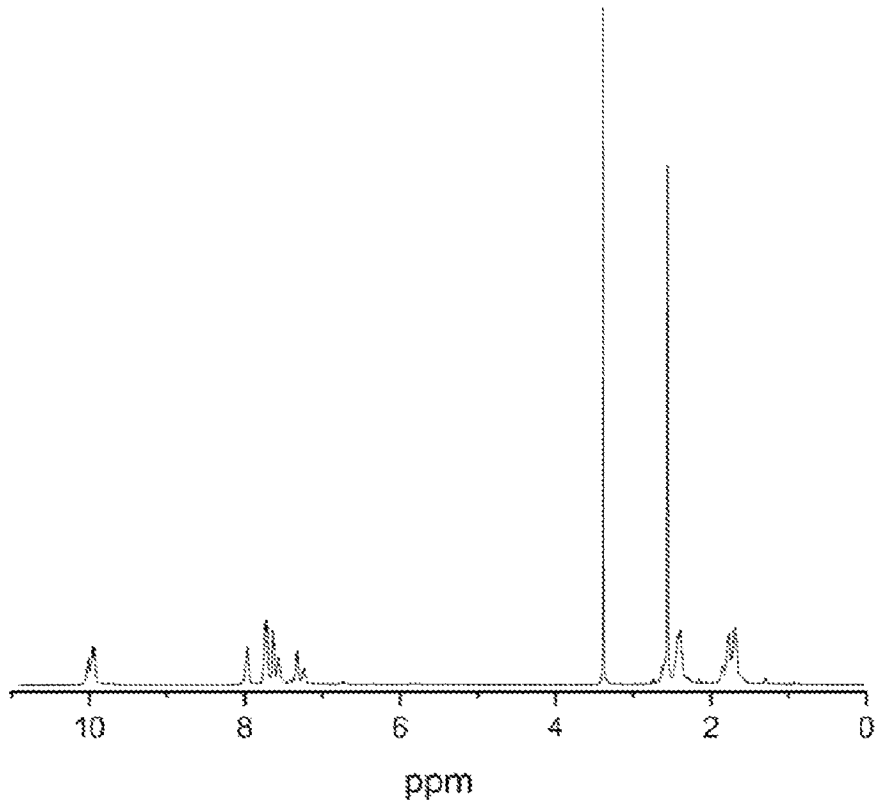
FIG. 15 is a $^{1}H$ NMR spectra polyamide copolymers of mixed naphthalene diamine, biphenyl diamine, and phenyl diamine and alkyl diacyl chloride.

For the aliphatic-aromatic polyamides soluble in DMSO, the chemical structures were confirmed by $^1$H NMR spectra and are shown in FIGS. 12-15. FIG. 12 is a $^1$H NMR spectra polyamide copolymers of isomeric mixed aromatic diamines derived from benzene and alkyl diacyl chloride corresponding to reaction polymerized product P1 from Reaction 15. FIG. 13 is a $^1$H NMR spectra polyamide copolymers of isomeric mixed aromatic diamines derived from m-xylene and alkyl diacyl chloride corresponding to polymerized product P3 from Reaction 17. FIG. 14 is a $^1$H NMR spectra polyamide copolymers of isomeric mixed naphthalene diamines derived from naphthalene and alkyl diacyl chloride corresponding to polymerized product P6 from Reaction 20. The resonances are marked with asterisks due to residual solvent in the tested sample. FIG. 15 is a $^1$H NMR spectra polyamide copolymers of mixed naphthalene diamine, biphenyl diamine, and phenyl diamine and alkyl diacyl chloride corresponding to polymerized product P 7 from Reaction 21.

Figure 16:
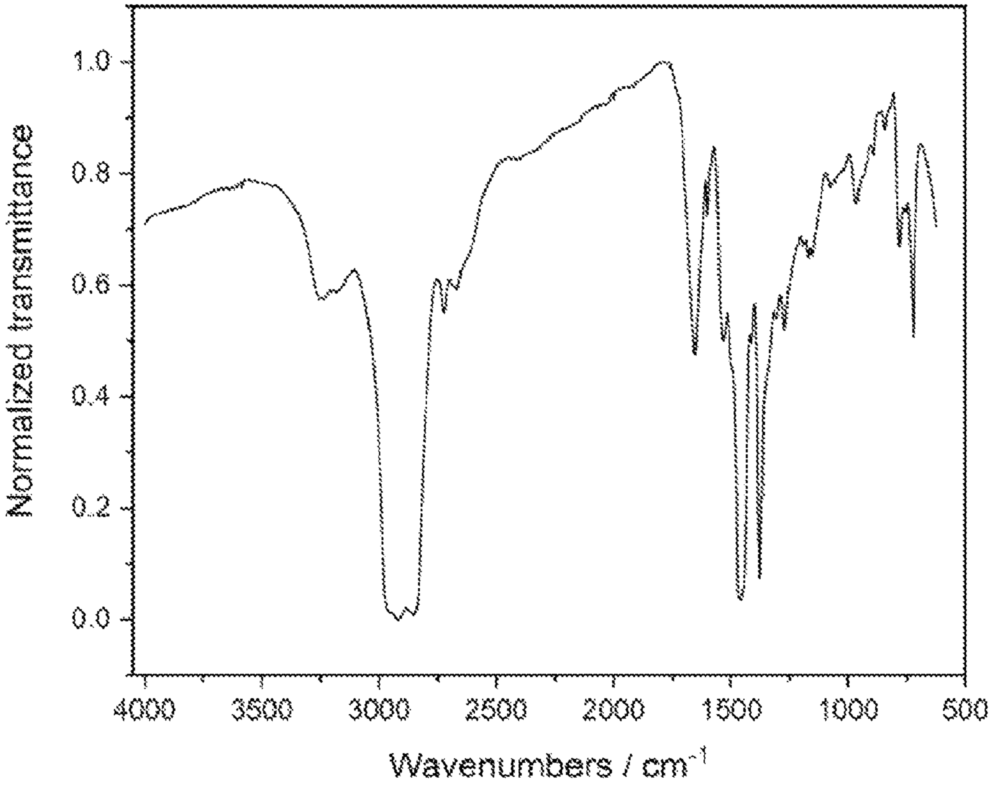
FIG. 16 is a Fourier Transform infra-red spectra of insoluble polyamides in DMSO.

A Fourier Transform Infra-Red spectrometry test was performed on polymerized produce P5 which is insoluble in DMSO. FIG. 16 shows the resulting FT-IR spectra. The spectra demonstrate absorption band at 3250 cm-1 which can be ascribed to the hydrogen bonded N—H stretching vibration. The two absorption bands were observed at 2900 cm-1 and 2850 cm-1 which were attributed to the asymmetric and symmetric stretching vibration of the methylene groups. The strong absorption band at 1650 cm−1 was due to the C═O stretching vibration, whereas the absorption bands at 1530 cm−1 and 1260 cm−1 were attributed to the N—H bending vibration. Moreover, the absorption bands at 1450 cm−1 and 1370 cm−1 are attributed the aromatic C═C stretching vibration.

Figure 17:
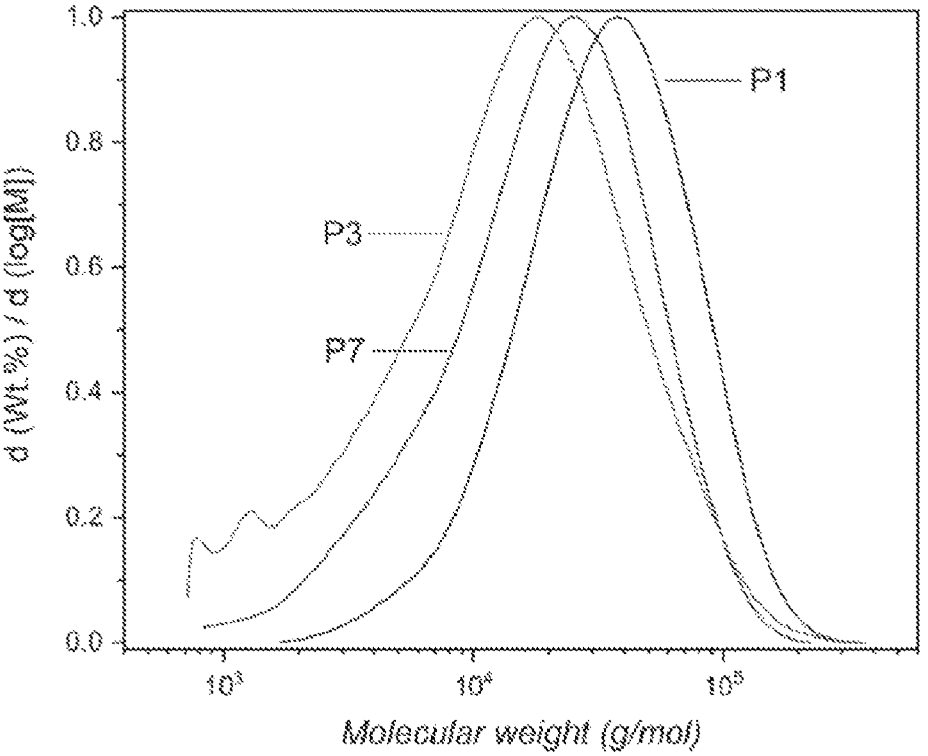
FIG. 17 is a size exclusion curve of polyamide copolymers.

The weight distribution of polymerized product P1 from Reaction 15, polymerized product P3 from Reaction 17, and polymerized product P7 from Reaction 21 were subjected to size exclusion chromatography (SEC) using polystyrene standards and N-methyl-2-pyrollidone (NMP) as the eluent in the presence of 0.1 molar concentration of LiCl. The SEC traces of the polyamide copolymers demonstrated unimodal molecular weight distributions indicating complete monomer conversion by the step-growth poly condensation reaction. The resulting molecular weight distributions of P1, P3 and P7 are shown in FIG. 17. The molecular weight characteristics are from the SEC test are shown in Table 1 where Mn is number average molecular weight, Mw is weight average molecular weight, Mp is molecular weight of the peak maxima, and Mw/Mn is the polydispersity index. It can be observed from Table 1 that polymerized product P1 corresponding to a mixture of o-phenylynediamine, m-phenylynediamine, and p-phenylynediamine has a higher molecular weight than any of RP1, RP2, and RP3 corresponding to pure o-phenylynediamine, m-phenylynediamine, and p-phenylynediamine, corresponding to which corresponds to o-phenylynediamine compared to

TABLE 1

| Polymer | $M_n$ | $M_w$ | $M_p$ | $M_w/M_n$ |
|---|---|---|---|---|
| RP1 | 14300 | 27200 | 24600 | 1.91 |
| PR2 | 21900 | 56400 | 39100 | 2.57 |
| RP3 | 17900 | 41600 | 34900 | 2.32 |
| P1 | 34300 | 62800 | 38300 | 1.83 |
| P2 | 8500 | 22100 | 10100 | 2.61 |
| P3 | 14800 | 35600 | 18500 | 2.34 |
| P4 | 5200 | 11700 | 6000 | 2.29 |
| P5 | 12400 | 38400 | 24500 | 3.09 |
| P6 | 16800 | 90500 | 26000 | 5.41 |
| P7 | 15400 | 32000 | 26100 | 2.09 |
| P8 | 8000 | 19500 | 16300 | 2.41 |

Figure 18:
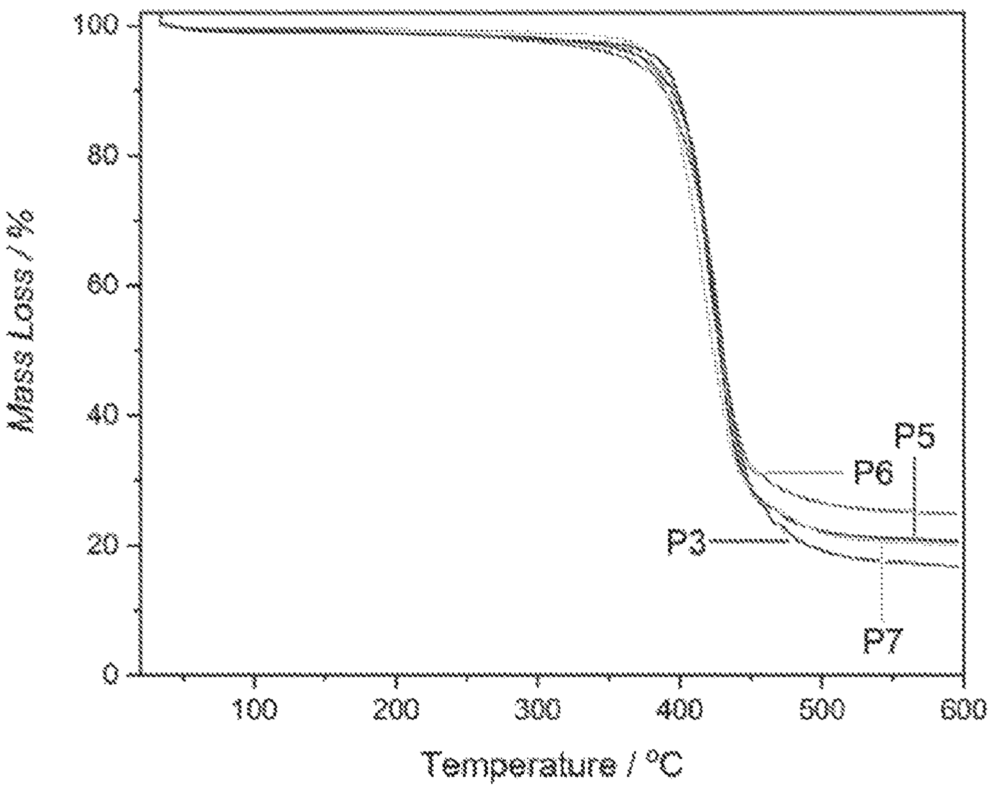
FIG. 18 is a thermogravimetric analysis curve of polyamide copolymers.

The thermal stability of the polymerized product P3 from Reaction 17, polymerized product P5 from Reaction 19, polymerized product P6 from Reaction 20, and polymerized product P7 from Reaction 21 were determined by thermogravimetric analysis (TGA) by heating at a rate of 10° C. min−1 from ambient temperature to 600° C. under an inert atmosphere. The main degradation profiles for the polyamides under inert atmospheres are shown in FIG. 18. TGA analysis of the polyamides suggest that the aliphatic-mixed aromatic polyamides are thermally stable up to 400° C. The char yield defined as the weight remaining at 500° C. was found to be ~30% for P6 and ~20% for P3.

Figure 19:
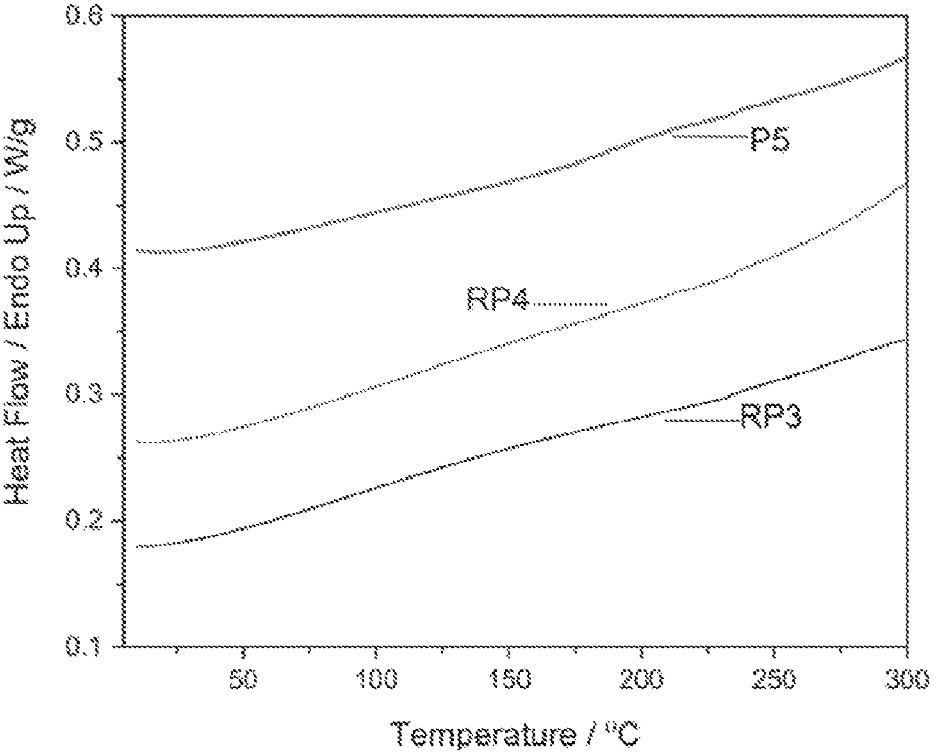
FIG. 19 is a differential scanning calorimetric thermogram of polyamide copolymers.
Figure 20:
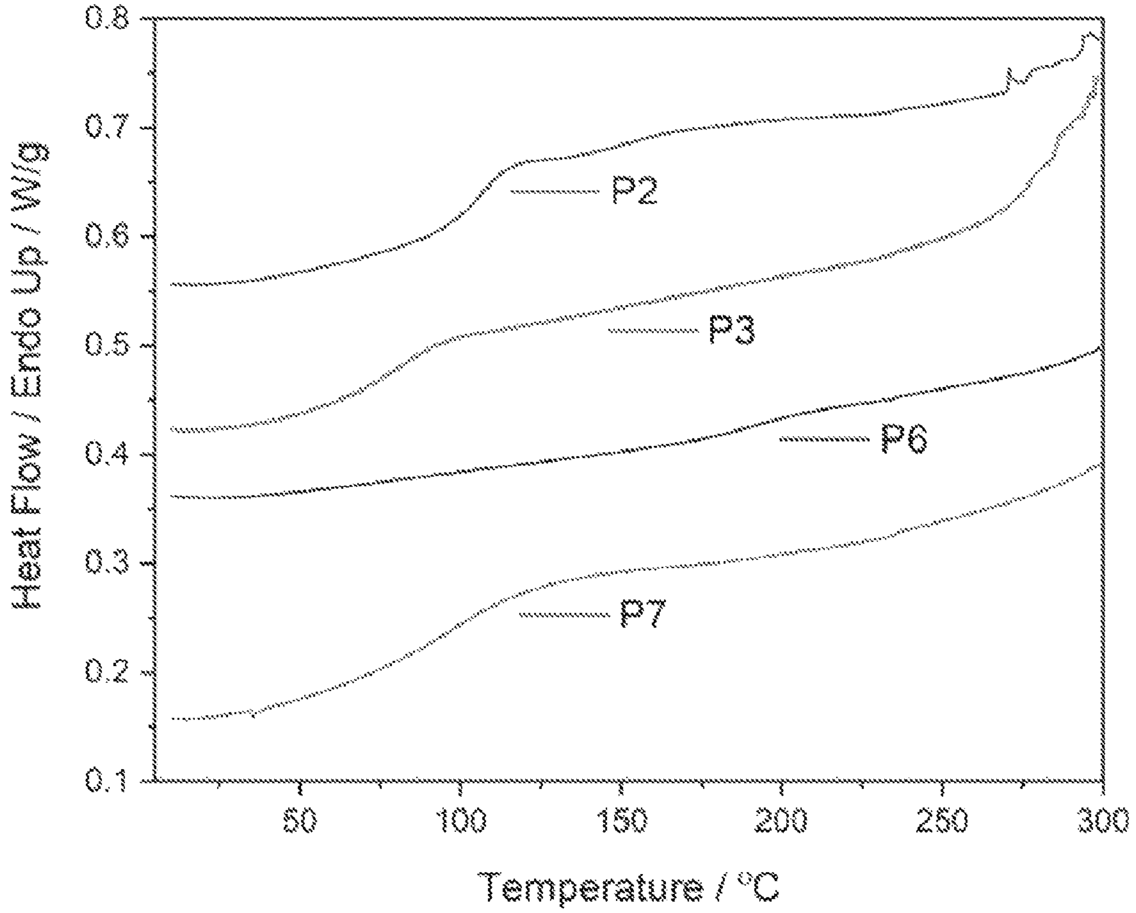
FIG. 20 is a differential scanning calorimetric thermogram of polyamide copolymers.

The thermal properties of the polymerized product P5 from Reaction 19, reference polymer 4 (RP4) from Reaction 35, reference polymer 3 (RP3) from Reaction 34, polymerized product P7 from Reaction 21, polymerized product P6 from Reaction 20, polymerized product P3 from Reaction 17, and polymerized product P2 from Reaction 16 were determined by differential scanning calorimetry (DSC) and thermal scans were taken at a rate of 10° C. min-1 upon a second heating from ambient temperature to 300° C. under inert atmosphere to determine the glass transition (Tg) and melting (Tm) temperatures of the polyamides. The DSC results are shown in FIG. 19 and FIG. 20. As depicted in FIG. 19, no obvious exothermic and endothermic peaks are observed for RP3, RP4 and P5 in the DSC traces indicating the glass transition temperature (Tg) and melting peak (Tm)

could be higher than 300° C. As shown in FIG. 20, the Tg of P2, P3, P6 and P7 are 115, 90, 200, 120° C., respectively. The higher Tg of P7 can be ascribed to its higher aromatic content as well as planar structure than the other polyamides. The TGA and DSC results indicated that the aliphatic-mixed aromatic polyamides could be attractive for practical applications such as processable high-performance engineering plastics.

Accordingly, the preceding description describes examples of processes and systems for producing aromatic amine monomers. The processes and systems disclosed herein may include any of the various features disclosed herein, including one or more of the following embodiments.

Accordingly, the preceding description describes examples of processes and systems for producing isomeric mixtures of aromatic amine monomers from aromatic feeds. The processes and systems disclosed herein may include any of the various features disclosed herein, including one or more of the following embodiments.

Embodiment 1. A method comprising: nitrating at least a portion of an aromatic feed to produce a mixture of nitrated aromatic compounds; hydrogenating at least a portion of the nitrated aromatic compounds to produce an isomeric mixture of aromatic amine monomers; and processing the isomeric mixture of aromatic amine monomers to form a product selected from an aromatic compound with a different functional group than the aromatic amine monomers, a polymerized product, or a reaction product of the aromatic amine monomers and $H_2S$.

Embodiment 2. The method of embodiment 1 wherein the aromatic feed comprises at least one aromatic compound selected from the group consisting of 1,3-cyclopentadiene, benzene, xylenes, mesitylene, ethylbenzene, cumene, 1, 2, 4, 5— tetramethyl benzene, biphenyl, tetrahydronaphthalene, naphthalene, acenaphthylene, biphenylene, fluorene, phenanthrene, anthracene, fluoranthene, pyrene, benzanthracene, chrysene, benzo[a]pyrene, any C1-C12 alkyl substituted compounds thereof, and any combinations thereof.

Embodiment 3. The method of any preceding embodiment wherein the step of nitrating comprises nitrating the aromatic feed with a mixture of sulfuric and nitric acid.

Embodiment 4. The method of any preceding embodiment wherein the step of nitrating comprises polynitrating such that the nitrated aromatic compounds comprise at least two nitro groups.

Embodiment 5. The method of any preceding embodiment wherein the step of hydrogenating comprises one or more of the following steps: hydrogenating using $H_2$ with palladium on carbon (Pd/C) catalyst, hydrogenating using $H_2$ and Raney nickel catalyst, hydrogenating using iron (Fe) under acidic conditions, hydrogenating using zinc (Zn) under acidic conditions, hydrogenating using tin(II) chloride (SnCl2) with alcohol reflux, hydrogenating using sodium sulfide (Na2S) with alcohol reflux, or hydrogenating using lithium aluminum hydride (LiAlH4) in THF.

Embodiment 6. The method of any preceding embodiment wherein step of processing comprises polymerizing at least a portion of the isomeric mixture of amine monomers with an alkyl diacyl halide, an aromatic diacyl halide, an aliphatic dicarboxylic acid, or combinations thereof to produce the polymerized product.

Embodiment 7. The method of embodiment 6 wherein the polymerization is step growth polymerization.

Embodiment 8. The method of embodiment 1 wherein at least a portion of the isomeric mixture of amine monomers comprise three or more amine functional groups and the step of processing comprises polymerizing at least a portion of the isomeric mixture of amine monomers comprising three or more amine functional groups to form a thermoset.

Embodiment 9. The method of embodiment 8 wherein the isomeric mixture of amine monomers comprises a mixture of aromatic amine monomers comprising two and three amine groups.

Embodiment 10. The method of embodiment 1 wherein the step of processing comprises reacting at least a portion of the isomeric mixture of amine monomers to form an isomeric mixture of compounds with a disparate functional group corresponding to the isomeric mixture of amine monomers.

Embodiment 11. The method of embodiment 1 wherein the step of processing comprises reacting at least a portion of the isomeric mixture of amine monomers with $H_2S$ to form the reaction product of the aromatic amine monomers and $H_2S$.

Embodiment 12. A method comprising: reacting a mixture of aromatic diamine monomers comprising at least two aromatic diamine monomers with a polymerizing agent to produce a polymerized product wherein the mixture of aromatic diamine monomers are produced by a process comprising nitrating at least a portion of an aromatic feed to produce a mixture of nitrated aromatic compounds and hydrogenating at least a portion of the nitrated aromatic compounds to produce an isomeric mixture of aromatic amine monomers.

Embodiment 13. The method of embodiment 12 wherein aromatic diamine monomers are selected from the group consisting of 1,3-cyclopentadiene diamine, benzene diamine, xylene diamine, mesitylene diamine, ethylbenzene diamine, cumene diamine, 1, 2, 4, 5— tetramethyl benzene diamine, biphenyl diamine, tetrahydronaphthalene diamine, naphthalene diamine, acenaphthylene diamine, biphenylene diamine, fluorene diamine, phenanthrene diamine, anthracene diamine, fluoranthene diamine, pyrene diamine, benzanthracene diamine, chrysene diamine, benzo[a]pyrene diamine, any C1-C12 alkyl substituted compounds thereof, and any combinations thereof.

Embodiment 14. The method of embodiment 12 wherein the polymerized product is a fully aromatic polyamide.

Embodiment 15. The method of any of embodiments 12-14 wherein the polymerizing agent comprises at least one agent selected from the group consisting of an alkyl diacyl halide, an aliphatic dicarboxylic acid, and any combinations thereof.

Embodiment 16. The method of embodiment 12 wherein the polymerizing agent comprises:

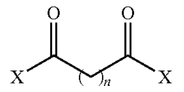

where n is any number between 1 and 20, and wherein X is a halide or hydroxyl.

Embodiment 17. A method comprising: selecting at least a first aromatic diamine monomer and a second aromatic diamine monomer such that a polymerized product comprising the first aromatic diamine monomer and the aromatic diamine monomer has a glass transition temperature below a glass transition temperature requirement; and polymerizing the first aromatic diamine monomer, the second aromatic diamine monomer, and an alkyl diacyl halide to produce the polymerized product with the glass transition temperature below the glass transition temperature requirement.

Embodiment 18. The method of embodiment 17 wherein aromatic diamine monomers are selected from the group consisting of 1,3-cyclopentadiene diamine, benzene diamine, xylene diamine, mesitylene diamine, ethylbenzene diamine, cumene diamine, 1, 2, 4, 5— tetramethyl benzene diamine, biphenyl diamine, tetrahydronaphthalene diamine, naphthalene diamine, acenaphthylene diamine, biphenylene diamine, fluorene diamine, phenanthrene diamine, anthracene diamine, fluoranthene diamine, pyrene diamine, benzanthracene diamine, chrysene diamine, benzo[a]pyrene diamine, any C1-C12 alkyl substituted compounds thereof, and any combinations thereof.

Embodiment 19. The method of embodiment 17 wherein the alkyl diacyl halide has the following structure:

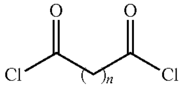

where n is any number between 1 and 20.

Embodiment 20. The method of embodiment 17 wherein the polymerized product comprises at least one of the following structures:

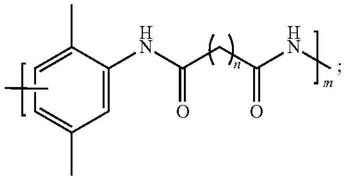

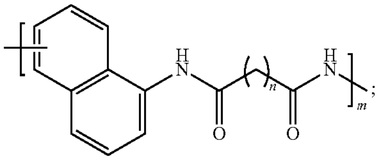

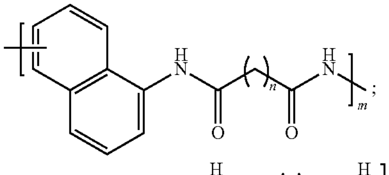

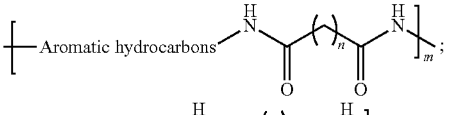

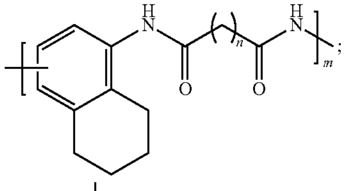

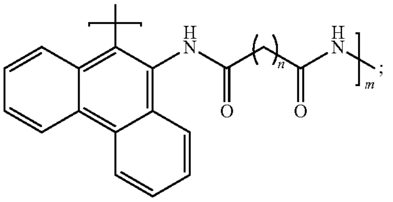

-continued

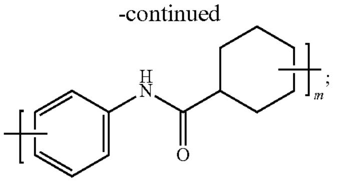

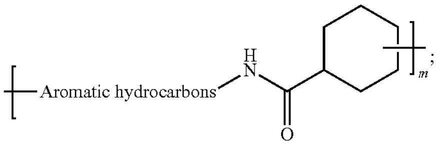

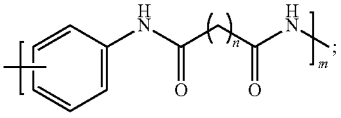

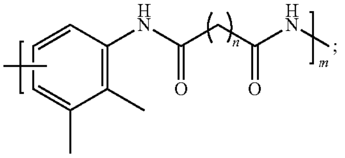

or

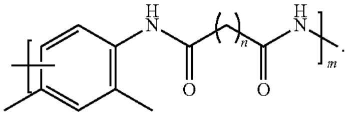

Embodiment 21. The method of embodiment 17 wherein the method further comprises: introducing the first aromatic diamine monomer, the second aromatic diamine monomer, and the alkyl diacyl halide into a mold containing a continuous reinforcing fiber prior to the step of polymerizing.

Embodiment 22. The method of embodiment 21 wherein the introducing comprises injecting the first aromatic diamine monomer, the second aromatic diamine monomer, and an alkyl diacyl halide into the mold.

While the disclosure has been described with respect to a number of embodiments and examples, those skilled in the art, having benefit of this disclosure, will appreciate that other embodiments can be devised which do not depart from the scope and spirit of the disclosure as disclosed herein. Although individual embodiments are discussed, the present disclosure covers all combinations of all those embodiments.

While compositions, methods, and processes are described herein in terms of “comprising,” “containing,” “having,” or “including” various components or steps, the compositions and methods can also “consist essentially of” or “consist of” the various components and steps. The phrases, unless otherwise specified, “consists essentially of” and “consisting essentially of” do not exclude the presence of other steps, elements, or materials, whether or not, specifically mentioned in this specification, so long as such steps, elements, or materials, do not affect the basic and novel characteristics of the disclosure, additionally, they do not exclude impurities and variances normally associated with the elements and materials used.

All numerical values within the detailed description and the claims herein modified by “about” or “approximately” with respect the indicated value are intended to take into account experimental error and variations that would be expected by a person having ordinary skill in the art.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

What is claimed is:

1. A method comprising:

nitrating at least a portion of an aromatic feed to produce a mixture of nitrated aromatic compounds;

hydrogenating at least a portion of the nitrated aromatic compounds to produce an isomeric mixture of aromatic amine monomers; and processing the isomeric mixture of aromatic amine monomers to form a product selected from an aromatic compound with a different functional group than the aromatic amine monomers, a polymerized product, or a reaction product of the aromatic amine monomers and H2S;

wherein at least a portion of the isomeric mixture of amine monomers comprise three or more amine functional groups and the step of processing comprises polymerizing at least a portion of the isomeric mixture of amine monomers comprising three or more amine functional groups to form a thermoset.

2. The method of claim 1 wherein the aromatic feed comprises at least one aromatic compound selected from the group consisting of 1,3-cyclopentadiene, benzene, xylenes, mesitylene, ethylbenzene, cumene, 1,2,4,5-tetramethyl benzene, biphenyl, tetrahydronaphthalene, naphthalene, acenaphthylene, biphenylene, fluorene, phenanthrene, anthracene, fluoranthene, pyrene, benzanthracene, chrysene, benzo[a]pyrene, any C1-C12 alkyl substituted compounds thereof, and any combinations thereof.

3. The method of claim 1 wherein the step of nitrating comprises nitrating the aromatic feed with a mixture of sulfuric and nitric acid.

4. The method of claim 1 wherein the step of nitrating comprises polynitrating such that the nitrated aromatic compounds comprise at least two nitro groups.

5. The method of claim 1, wherein the step of hydrogenating comprises one or more of the following steps: hydrogenating using H2 with palladium on carbon (Pd/C) catalyst, hydrogenating using H2 and Raney nickel catalyst, hydrogenating using iron (Fe) under acidic conditions, hydrogenating using zinc (Zn) under acidic conditions, hydrogenating using tin(II) chloride (SnC12) with alcohol reflux, hydrogenating using sodium sulfide (Na2S) with alcohol reflux, or hydrogenating using lithium aluminum hydride (LiAlH4) in THF.

6. The method of claim 1 wherein step of processing comprises polymerizing at least a portion of the isomeric mixture of amine monomers with an alkyl diacyl halide, an aromatic diacyl halide, an aliphatic dicarboxyhc acid, or combinations thereof to produce the polymerized product.

7. The method of claim 6 wherein the polymerization is step growth polymerization.

8. The method of claim 1 wherein the isomeric mixture of amine monomers comprises a mixture of aromatic amine monomers comprising two and three amine groups.

9. The method of claim 1 wherein the step of processing comprises reacting at least a portion of the isomeric mixture of amine monomers to form an isomeric mixture of compounds with a disparate functional group corresponding to the isomeric mixture of amine monomers.

10. The method of claim 1 wherein the step of processing comprises reacting at least a portion of the isomeric mixture of amine monomers with H2S to form the reaction product of the aromatic amine monomers and H2S.

11. A method comprising:

selecting a polymerizing agent to produce a polymerized product with tunable physical properties;

reacting a mixture of isomeric aromatic amine monomers comprising two and three amine groups with the polymerizing agent, wherein the mixture of aromatic diamine monomers are produced by a process comprising nitrating at least a portion of an aromatic feed to produce a mixture of nitrated aromatic compounds; and hydrogenating at least a portion of the nitrated aromatic compounds to produce an isomeric mixture of aromatic amine monomers.

12. The method of claim 11 wherein aromatic diamine monomers are selected from the group consisting of 1,3-cyclopentadiene diamine, benzene diamine, xylene diamine, mesitylene diamine, ethylbenzene diamine, cumene diamine, 1,2,4,5-tetramethyl benzene diamine, biphenyl diamine, tetrahydronaphthalene diamine, naphthalene diamine, acenaphthylene diamine, biphenylene diamine, fluorene diamine, phenanthrene diamine, anthracene diamine, fluoranthene diamine, pyrene diamine, benzanthracene diamine, chrysene diamine, benzo[a]pyrene diamine, any C1-Cl 2 alkyl substituted compounds thereof, and any combinations thereof.

13. The method of claim 11 wherein the polymerized product is a fully aromatic polyamide.

14. The method of claim 11 wherein the polymerizing agent comprises at least one agent selected from the group consisting of an alkyl diacyl halide, an aliphatic dicarboxylic acid, and any combinations thereof.

15. The method of claim 11 wherein the polymerizing agent comprises:

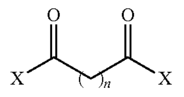

where n is any number between 1 and 20, and wherein X is a halide or hydroxyl.

16. A method comprising:

selecting at least a first aromatic dillamine monomer and a second aromatic amine monomer such that a polymerized product comprising the first aromatic amine monomer and the second aromatic amine monomer has a glass transition temperature below a glass transition temperature requirement, wherein the at least first aromatic amine monomer and the second aromatic amine monomer comprises two and three amine groups; and polymerizing the first aromatic amine monomer, the second aromatic amine monomer, and an alkyl diacyl halide with a selected alkyl chain length to produce the polymerized product with the glass transition temperature below the glass transition temperature requirement.

17. The method of claim 16 wherein aromatic diamine monomers are selected from the group consisting of 1,3-cyclopentadiene diamine, benzene diamine, xylene diamine, mesitylene diamine, ethylbenzene diamine, cumene diamine, 1,2,4,5-tetramethyl benzene diamine, biphenyl diamine, tetrahydronaphthalene diamine, naphthalene diamine, acenaphthylene diamine, biphenylene diamine, fluorene diamine, phenanthrene diamine, anthracene diamine, fluoranthene diamine, pyrene diamine, benzanthracene diamine, chrysene diamine, benzo[a]pyrene diamine, any C1-Cl 2 alkyl substituted compounds thereof, and any combinations thereof.

18. The method of claim 16 wherein the alkyl diacyl halide has the following structure:

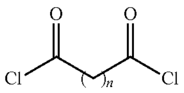

where n is any number between 1 and 20.

19. The method of claim 16 wherein the polymerized product comprises at least one of the following structures:

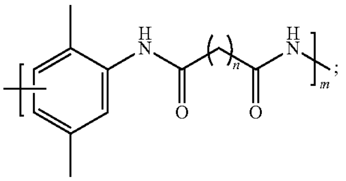

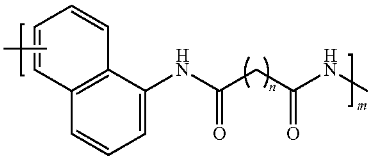

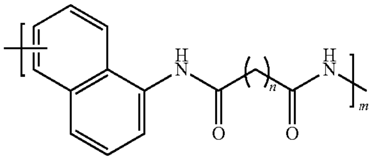

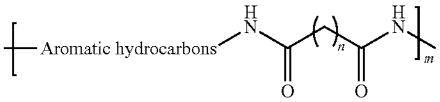

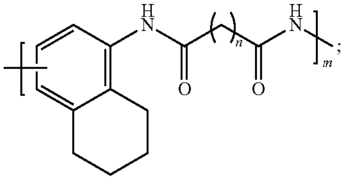

-continued

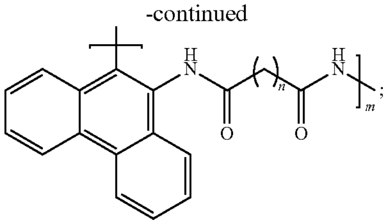

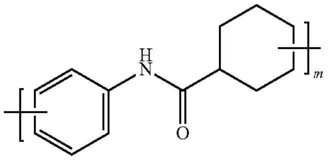

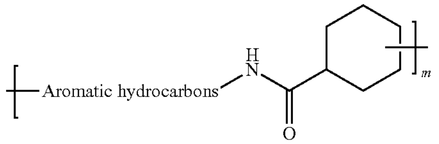

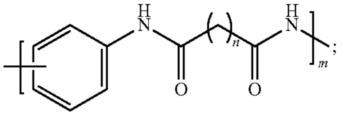

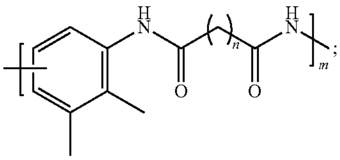

or

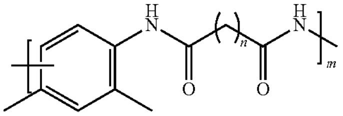

20. The method of claim 16 wherein the method further comprises: introducing the first aromatic diamine monomer, the second aromatic diamine monomer, and the alkyl diacyl halide into a mold containing a continuous reinforcing fiber prior to the step of polymerizing.

21. The method of claim 20 wherein the introducing comprises injecting the first aromatic diamine monomer, the second aromatic diamine monomer, and an alkyl diacyl halide into the mold.

* * * * *